(12) United States Patent
Eckert

(10) Patent No.: US 10,377,356 B2
(45) Date of Patent: Aug. 13, 2019

(54) METHOD FOR ADJUSTING BRAKE PRESSURES OF A VEHICLE, AND BRAKE SYSTEM FOR CARRYING OUT THE METHOD

(71) Applicant: WABCO GmbH, Hannover (DE)

(72) Inventor: Horst Eckert, Rehburg-Loccum (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 16/060,029

(22) PCT Filed: Nov. 17, 2016

(86) PCT No.: PCT/EP2016/001916
§ 371 (c)(1),
(2) Date: Jun. 7, 2018

(87) PCT Pub. No.: WO2017/097394
PCT Pub. Date: Jun. 15, 2017

(65) Prior Publication Data
US 2018/0354478 A1 Dec. 13, 2018

(30) Foreign Application Priority Data

Dec. 9, 2015 (DE) .................. 10 2015 015 924
Oct. 27, 2016 (DE) .................. 10 2016 013 054

(51) Int. Cl.
*B60T 8/1761* (2006.01)
*B60T 13/68* (2006.01)
(Continued)

(52) U.S. Cl.
CPC ............ *B60T 8/17616* (2013.01); *B60T 7/12* (2013.01); *B60T 8/1701* (2013.01); *B60T 8/171* (2013.01);
(Continued)

(58) Field of Classification Search
CPC .... B60T 8/17616; B60T 8/321; B60T 13/683; B60T 8/1701; B60T 7/12; B60T 8/171;
(Continued)

(56) References Cited

U.S. PATENT DOCUMENTS 5,011,236 A 4/1991 Toepfer et al.
9,016,807 B1 * 4/2015 Pieronek ............... B60T 8/1708
303/123
(Continued)

FOREIGN PATENT DOCUMENTS

DE 3829951 A1 3/1990
DE 10259271 A1 7/2003
(Continued)

*Primary Examiner* — Nga X Nguyen
(74) *Attorney, Agent, or Firm* — Leydig, Voit & Mayer, Ltd.

(57) ABSTRACT

A method for adjusting brake pressures at pneumatically actuated wheel brakes of a vehicle includes, after an external braking demand, continuously ascertaining, by a brake control unit, in a pressure control mode, at least one differential slip value from measuring signals supplied by speed sensors of the wheels, as the difference between the slip of two axles of the vehicle before releasing the control signals; evaluating the differential slip value with consideration for a predefined or adjustable setpoint differential slip value; and depending on the evaluation, bringing the differential slip value closer to the setpoint differential slip value by adapting at least one control signal.

24 Claims, 9 Drawing Sheets

(51) Int. Cl.
  *B60T 7/12* (2006.01)
  *B60T 8/17* (2006.01)
  *B60T 8/171* (2006.01)
  *B60T 8/172* (2006.01)
  *B60T 8/32* (2006.01)
  *B60T 8/1766* (2006.01)
  *B60T 13/66* (2006.01)
  *B60T 15/04* (2006.01)

(52) U.S. Cl.
  CPC ............ *B60T 8/172* (2013.01); *B60T 8/1766* (2013.01); *B60T 8/321* (2013.01); *B60T 13/662* (2013.01); *B60T 13/683* (2013.01); *B60T 15/043* (2013.01); *B60T 2240/00* (2013.01); *B60T 2250/00* (2013.01); *B60T 2270/10* (2013.01)

(58) Field of Classification Search
  CPC .. B60T 8/172; B60T 2270/10; B60T 2250/00; B60T 2240/00; B60T 8/1766; B60T 15/043; B60T 13/662

USPC .................................................. 701/71, 34.5
  See application file for complete search history.

(56) References Cited

U.S. PATENT DOCUMENTS

2011/0246031 A1* 10/2011 Uematsu ................ B60K 17/35
                                                                 701/50
2012/0203438 A1    8/2012 Breuer et al.

FOREIGN PATENT DOCUMENTS

| DE | 102009034450 A1 | 1/2011 |
| DE | 102009058154 A1 | 6/2011 |
| EP | 2093113 A1 | 8/2009 |
| WO | WO 2008006568 A1 | 1/2008 |

* cited by examiner

METHOD FOR ADJUSTING BRAKE PRESSURES OF A VEHICLE, AND BRAKE SYSTEM FOR CARRYING OUT THE METHOD

CROSS REFERENCE TO RELATED APPLICATIONS

This application is a U.S. National Stage Application under 35 U.S.C. § 371 of International Application No. PCT/EP2016/001916 filed on Nov. 17, 2016, and claims benefit to German Patent Application Nos. DE 10 2015 015 924.0 filed on Dec. 9, 2015 and DE 10 2016 013 054.7 filed on Oct. 27, 2016. The International Application was published in German on Jun. 15, 2017 as WO 2017/097394 A1 under PCT Article 21(2).

FIELD

The invention relates to a method for adjusting brake pressures at pneumatically actuated wheel brakes of a vehicle, to a braking system of a vehicle, and to a vehicle comprising such a braking system.

BACKGROUND

In order to decelerate a motor vehicle, the wheels of the motor vehicle are braked. In commercial vehicles in particular, each of the wheel brakes of the wheels comprises brake cylinders, wherein the desired brake pressure in the brake cylinders is generally generated pneumatically.

In a normal braking mode, the brake pressure is adjusted depending on a driver's braking demand determined by the driver of the motor vehicle. Generally, the driver of the motor vehicle transmits his/her driver's braking demand by actuating a brake pedal. In known braking systems, a service-brake valve, which controls the supply of the brake cylinder from a pressure reservoir, is often actuated by means of the brake pedal.

Alternatively to the normal braking mode, in a pressure control mode, the brake pressure is adjusted by a brake control unit at the particular wheel brakes according to the requirements of the brake control unit when corresponding braking requirements have been established. Such braking requirements can be, for example, antilock interventions, when the brake control unit establishes that certain wheels tend to lock. DE 10 2009 058 154 A1 discloses such a braking system which also takes over the adjustment of the brake pressure in the pressure control mode when an external braking demand independent of the driver's braking demand is received, for example the braking demand of a driver assistance system. Driver assistance systems, as systems designed separately from the brake control unit, output signals corresponding to the desired braking power to the brake control unit of the braking system, for example via a data bus.

In the known braking system, the brake control unit carries out a control of the braking systems on the basis of the driver's braking demand and, in addition, on the basis of internal control processes such as antilock interventions or a stability control, and on the basis of the additional external braking demand. The external braking demand is specified to the brake control unit as a setpoint deceleration value, i.e., as a value which represents the deceleration of the motor vehicle desired by the driver assistance system. If external braking demands as well as a driver's braking demand arise in the pressure control mode, i.e., the driver brakes in addition to the external braking demand, the brake control unit adjusts the brake pressure at the particular brakes in accordance with a resultant setpoint deceleration value of the vehicle deceleration. In the known braking system, the driver's braking demand and the external braking demand are additively linked. Alternatively, in the known braking system, in a "maximum" mode, the maximum value is to be formed, by the control unit, from the setpoint deceleration value demanded internally by the braking system due to a driver's braking demand and an externally demanded setpoint deceleration value. An externally demanded braking demand is adjusted only when it is higher than the internal braking demand.

The takeover of the adjustment of the brake pressure in the pressure control mode by a brake control unit when certain wheels tend to lock is known by the designation "antilock braking system" (ABS). The fact is, in every braking operation, only a braking force corresponding to the road friction coefficient can be utilized. If the introduced braking force exceeds the maximum braking force that can be transmitted at one or multiple wheels, the wheels begin to lock, whereby the motor vehicle can become unstable. An ABS system permanently monitors, via measuring signals from speed sensors, the speed of each wheel and, on the basis thereof, ascertains the particular wheel slip. This can take place, for example, by comparing the wheel speed ascertained from the wheel rotational speed with a (computed) vehicle reference speed. If a tendency for the wheel to lock is detected via the wheel slip ascertained in this way, i.e., an ABS slip limit has been reached or exceeded, the brake control unit takes over the control by adjusting the brake pressure. In this case, in a first step, the brake pressure is reduced in order to subsequently regulate the brake pressure of the relevant wheel along the slip limit. In this case, the braking torque is increased again for as long as it takes for a braking torque corresponding to the road friction coefficient to be reached. As a result, in principle, the vehicle is to be nearly optimally decelerated and, simultaneously, the stability and steerability are to be retained.

DE 3829951 A1 discloses a method for carrying out a load-dependent regulation of the brake pressure on a commercial vehicle, which utilizes the components of an existing antilock braking system (ABS) in order to therefore implement an automatic, load-dependent braking function in the normal braking mode that also functions well below the wheel locking limit. In the known method, the brake pressure and, therefore, the braking force distribution are to be controlled below the wheel locking limit in an axle-specific manner, wherein an interaxle brake pressure distribution is automatically controlled—in accordance with the evaluation of the wheel rotational speed signals delivered by the wheel speed sensors—in a slip range below the range in which the ABS function takes effect.

In a method of the generic type for adjusting the brake pressure, for example according to DE 10 2009 058 154 A1, if a need for regulation by the ABS system arises in the pressure control mode after an external braking demand has been received, i.e., it is established that the slip limit has been reached or exceeded at at least one vehicle wheel and, therefore, it is determined that the relevant wheel has a tendency to lock, the antilock function takes over the control by adjusting the brake pressure in the pressure control mode. An implementation of the brake pressure control via ABS during an external braking demand yields disadvantages, in principle. It becomes difficult to adjust the brake pressure in accordance with the demanded vehicle deceleration and, last but not least, the safety of the braking and the driving comfort decrease. In particular, an undesirable jerk occurs, again and again, due to a sudden increase in the brake pressure.

SUMMARY

In an embodiment, the present invention provides a method for adjusting brake pressures at pneumatically actuated wheel brakes of a vehicle, wherein the brake pressures at the wheel brakes are adjusted in a normal braking mode depending on a driver's braking demand determined by a driver of the vehicle, and wherein, when an external braking demand independent of the driver's braking demand is received and/or when certain wheels tend to lock, a brake control unit takes over adjustment of the brake pressures in a pressure control mode, wherein the brake control unit, in the pressure control mode, ascertains control signals for pressure control valves of the particular wheel brakes and changes the brake pressures of the relevant wheel brake by controlling the pressure control valves. The method includes, after an external braking demand, continuously ascertaining, by the brake control unit, in the pressure control mode, at least one differential slip value from measuring signals supplied by speed sensors of the wheels, as the difference between the slip of two axles of the vehicle before releasing the control signals; evaluating the differential slip value with consideration for a predefined or adjustable setpoint differential slip value; and depending on the evaluation, bringing the differential slip value closer to the setpoint differential slip value by adapting at least one control signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
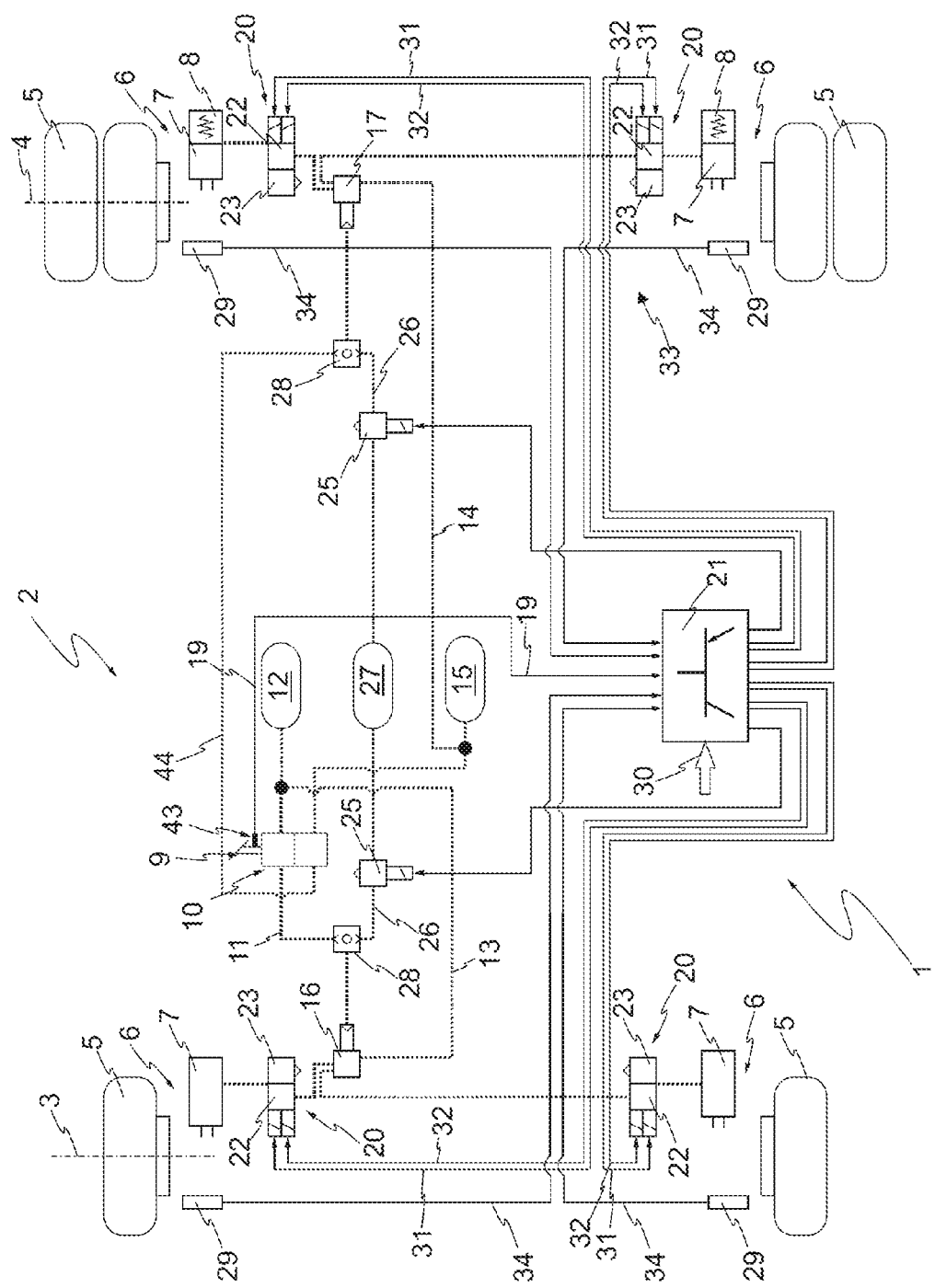
FIG. 1 shows a pneumatic and electrical diagram of a braking system of a commercial vehicle.

Embodiments of the present invention provide for a jerk-free and constant braking behavior of a vehicle or of a vehicle combination comprising several vehicles during an adjustment of a brake pressure in a pressure control mode after an external braking demand.

After an external braking demand, a brake control unit ascertains control signals for the relevant pressure control valves for implementing the external braking demand in the pressure control mode, wherein, according to embodiments of the invention, before the control signals are released, at least one differential slip value is continuously ascertained, from measuring signals supplied by speed sensors of the wheels, as the difference between the slip of two axles of the vehicle, and the differential slip value is brought closer to a predefined or adjustable setpoint differential slip value by adapting at least one control signal for the pressure control valves of at least one wheel brake. The brake control unit therefore carries out a supervision of the control signals initially ascertained for implementing the braking demand, specifically with consideration for the setpoint differential slip value, before releasing the ascertained control signals. By way of the adaptation of the control signals, the physical variables and the rotational behavior of the wheel change during the braking operation due to the change in the brake pressure of the relevant wheel brake. By way of the change in the brake pressure, a desired differential slip between two axles or wheels is directly adjusted, without the need to know the level of the brake pressure. As a result, the wheels of two axles have an identical, desirable rotational behavior relative to each other.

During a continuous application of the brakes, the occurrence of a tendency to lock due to an external braking demand results—due to the usually higher priority of the antilock control action—in at least one wheel or one axle being controlled along the particular slip limit, according to the antilock function and, therefore, the maximum possible braking force is transmitted onto the roadway up to the end of an antilock intervention. States often occur during the operation of a vehicle, however, in which low friction conditions only for a very short period of time, a so-called µ jump, and therefore corresponding slip conditions for a short period of time and prompt a response by the antilock function; therefore, the wheel or the axle and, therefore, the entire vehicle is regularly overbraked. Even in the case of a very brief µ jump, the relevant wheel or an axle transmits the maximum possible braking force onto the roadway for the entire remaining duration of the braking operation. In most cases, however, this does not correspond to the external braking demand which therefore generally cannot be implemented.

According to embodiments of the invention, an active intervention of the brake control unit is prevented when there is a tendency to lock for only very short intervals, in that the brake control unit carries out a supervision of the control signals on the basis of the differential slip conditions, in the pressure control mode, after an external braking demand and before the ascertained control signals are released. Due to the supervision of the control signals, according to embodiments of the invention, on the basis of the differential slip values, dynamic brake pressures are adjusted at the individual axles and wheels during the entire braking operation and every computation cycle in the pressure control mode. As a result, a rotational behavior of the wheels of the vehicle relative to each other is adjusted according to the desired and correspondingly predefined differential slip, throughout the entire braking operation, with the aid of individually ascertained brake pressures at the wheel brakes, which are immediately derived and adapted from the presently ascertained interaxle differential slip. As a result, an optimal braking force distribution between the axles and wheels and, therefore, a high level of safety in the vehicle, is always ensured: Furthermore, an undesirable intervention by the ABS is ruled out for as long as possible and is carried out as late as possible under the given physical conditions. All wheels of the vehicle lock simultaneously or nearly simultaneously.

In one advantageous embodiment of the braking system, the pressure control valves each comprise an inlet valve for increasing the brake pressure and an outlet valve for reducing the brake pressure. As a result, one possibility for the particularly fine readjustment of the differential slip value of two axles toward the predefined setpoint differential slip value is that the control signal of an inlet valve or of an outlet valve of the pressure control value of the same axle is changed.

Yet another possibility for the fine adaptation of the brake pressure distribution for adjusting a desirable differential slip between at least two wheels is to simultaneously control the inlet valve and the outlet valve of the same pressure control valve, i.e., with overlapping control times. In this case, the desired change in the brake pressure distribution can be achieved by changing the pulse pattern of a pulse-modulated control of the inlet and outlet valves. Alternatively or additionally, the control signal or the pulse pattern of an inlet valve or an outlet valve acting on the particular other axle is changed.

The re-ascertained control signals or pulse patterns are also subject to the supervision according to embodiments of the invention by means of an evaluation of a differential slip value and bringing the differential slip value closer to a predefined setpoint differential slip value. In one advantageous embodiment, the setpoint differential slip value is predefined in an adjustable manner.

The differential slip value is adjusted with the setpoint differential slip value as the guide variable. In a main loop for the adjustment, control signals for the pressure control valves are ascertained on the basis of a regulation (closed loop) of a dynamic variable of the vehicle, in particular the present deceleration, and these control signals are monitored with the aid of the supervision according to embodiments of the invention. In this case, the interaxle differential slip value is controlled to the setpoint differential slip. The brake pressure is controlled (open loop) via the control signals, and the values of pulse and cycle times of the valves are advantageously taken from predefined tables. When the control targets "deceleration" and/or "differential slip value" are not met, an "open loop" is controlled by means of a pressure variation with the aid of the valves.

In the case of an exclusive braking operation due to an external braking demand, the setpoint differential slip value is advantageously specified depending on the demanded setpoint deceleration of the vehicle according to the external braking demand. If there is a combined braking operation consisting of an external braking demand and driver braking, the specification of the setpoint differential slip value depends on the resultant setpoint deceleration of the vehicle, which results on the basis of both braking demands. Alternatively, the setpoint differential slip value is dependent on the actual deceleration of the vehicle.

A setpoint differential slip value is preferably specified in such a way that, in a lower range of the demanded deceleration, the rear axle or, in the case of multiple rear axles, one of the rear axles has a greater slip than a front axle. As the magnitude of the braking demand or the present actual deceleration of the vehicle increases, the predefined setpoint differential slip is changed in the direction of an equalized value between the rear axle and the front axle, i.e., the setpoint differential slip is increasingly reduced, if necessary until the value "zero" has been reached. In yet another embodiment of the invention, the setpoint differential slip value is less than zero in the case of braking demands in the upper range of demanded decelerations, i.e., in the case of high decelerations, the front axle has a higher slip than the rear axle, i.e., the wheels of the front axle rotate at lower wheel speeds than the wheels of the rear axle.

Advantageously, the differential slip value is evaluated with consideration for at least one predefined control criterion. Depending on the evaluation, the brake control unit releases the ascertained control signals or initiates the adjustment of the differential slip value toward the setpoint differential slip value by adapting at least one control signal with respect to a reduction of the differential slip value. The evaluation of the differential slip value, i.e., the difference between the slip values of two axles, takes place on the basis of a comparison of the differential slip value with the control criterion.

In one advantageous embodiment of the invention, at least one slip threshold value is specified to the brake control unit as a control criterion for the evaluation of the differential slip value. If the slip threshold value is exceeded, an active readjustment of the differential slip value toward the setpoint differential slip value takes place by way of an adaptation of the control signals. As a result, the brake pressure at the particular controlled wheel brake is changed. In this case, a single slip threshold value suffices for the evaluation of a differential slip value, in order to initiate the adaptation of control signals in this embodiment.

In order to readjust the differential slip value, the supervision evaluates the trend of the change in the differential slip. If a certain axle has a positive differential slip as compared to the other axle of the axle pair under consideration, for example, it can be deduced therefrom that the relevant axle is over-braked relative to the other axle. If the supervision ascertains control signals for the inlet valves of the axle tending to over-brake, the supervision prevents the implementation of the relevant pulse pattern with which the axle, or at least one wheel of the relevant axle, would enter even further into an over-braking state. The initially ascertained pulse pattern for the inlet valve is initially blocked for an implementation and a new pulse pattern is ascertained with respect to an adaptation of the brake pressure distribution. The evaluation of the differential slip value takes place continuously.

In yet another advantageous embodiment of the invention, a tolerance range having an upper slip threshold value and a lower slip threshold value is specified to the control unit as the control criterion for the evaluation of the differential slip value. The parameterization of the tolerance range with slip threshold values can be determined in advance or can also be adjustable, as required. If the upper slip threshold value is exceeded or the lower slip threshold value is fallen below, an adaptation of the control signals takes place in order to readjust the differential slip value. In this case, the upper slip threshold value of the predefined tolerance range is utilized, in particular, for changing the control signals or the pulse pattern for the inlet valves of the axle tending to over-brake. The lower slip threshold value is correspondingly utilized, in particular, for the supervision of the control signals of outlet valves. If the ascertained differential slip value falls below the lower slip threshold value of the tolerance range, the initially ascertained control signal for outlet valves is not implemented; instead, a recalculation of the control signals is carried out.

The supervision ensures that control signals for inlet valves are released only when differential slip values are below the upper slip threshold value. Correspondingly, control signals for outlet valves are released for implementation by the outlet valves only when differential slip values are ascertained, within the scope of the supervision, above the lower slip threshold value.

Advantageously, two tolerance ranges, which can each be parameterized with a lower slip threshold value and an upper slip threshold value, are predefined for evaluating the differential slip value. In this case, a first tolerance range is utilized in the pressure control mode with external braking demands without active retarders. The second tolerance range is utilized in pressure control modes when active retarders, for example engine brakes, are active at the relevant axle. In the case of an external braking demand, the brake control unit distinguishes whether a retarder is active at one of the axles or not, and the particular tolerance range provided forms the basis for the supervision of the ascertained control signals. In this way, it can be established that a higher upper slip value is used as the basis in the case of an active retarder, and therefore aspects of a wear of brake pads, for example, can be taken into account.

A prevention of undesirable antilock interventions is given by means of a representative supervision of the control signals in vehicles comprising more than two axles, in that differential slip values are ascertained for multiple axles, in each case based on a reference axle taken into account in all axle pairs. This reference axle, which is taken into account in all differential slip values, is preferably the front axle.

In one advantageous embodiment, the brake circuits of the pressure control valves can be connected to a pressure medium supply via actuation of one activation valve per brake circuit. These activation valves are actuated and switched by the brake control unit. When the pressure control mode is concluded, the activation valve of the relevant brake circuit is brought into the closed position by the brake control unit, whereby the connection of the connected pressure control valves to the pressure medium supply is disconnected. Advantageously, assigned to each axle is a separate brake circuit, the wheel brakes of which are each supplied by the brake circuit.

Embodiments of the invention are advantageous in the case of vehicles, in particular, which are equipped with pneumatically actuatable wheel brakes. The vehicle is advantageously a motor vehicle in this case, i.e., the type of vehicle that is driven by engine power, or a towed vehicle for motor vehicles. Embodiments of the invention are preferably utilized in commercial vehicles and vehicle combinations comprising a vehicle which is referred to as the towing vehicle in the vehicle combination, and one or multiple towed vehicles. A towed vehicle generally comprises a separate braking system which implements requirements of the brake control unit of the towing vehicle, for example a setpoint deceleration or a setpoint brake pressure. Furthermore, towed vehicles can be equipped with a driver assistance system which specifies external braking demands to the brake control unit of the towing vehicle. A commercial vehicle is a motor vehicle which is intended, according to its type and configuration, for hauling persons or goods or for towing towed vehicles.

In a vehicle combination, in which a data transmission takes place between the component vehicles, for example via a CAN interface, a differential slip-dependent trailer brake pressure control via the brake control unit of the towing vehicle is possible when an electronic brake module of a towed vehicle is connected to the brake control unit in a signal-transmitting manner in order to control the pressure control valves of the trailer axles.

In this case, at least one wheel speed signal, e.g., a wheel speed of at least one wheel of the towed vehicle, is transmitted via the CAN interface to the brake control unit of the motor vehicle or the towing vehicle. The brake control unit of the towing vehicle determines a differential slip-dependent trailer brake pressure and controls it or provides a brake module of the towed vehicle with appropriate requirements, whereby the brake module adjusts the desired brake pressure at the wheel brakes of the towed vehicle. Therefore, the differential slip between the wheels or an axle of the trailer and the reference axle of the towing vehicle, i.e., advantageously the front axle, is advantageously ascertained and utilized for the pressure adjustment according to embodiments of the invention.

Advantageously, the braking system comprises an additional trailer pressure control valve for adjusting the trailer brake pressure, which can be controlled by the brake control unit of the towing vehicle and which is situated in the towing vehicle and is connected to a trailer control valve of the towing vehicle. In this way, the presently optimal trailer brake pressure can be adjusted in order to implement the braking requirements with little structural outlay for communication of the part of the braking system of the vehicle combination belonging to the towing vehicle and of the part of the braking system belonging to the towed vehicle. The braking systems of the towing vehicle and of the towed vehicles can function largely autonomously and can simultaneously interact within the scope of the adjustment of the brake pressure according to embodiments of the invention. The brake module of the towed vehicle, in addition to its genuine function, forwards the information regarding the rotational behavior of the wheels or axles of the towed vehicle required by the brake control unit of the towing vehicle.

In one advantageous embodiment of the invention, the trailer axle is determined that presently has the least slip in order to determine the brake pressures in a vehicle combination comprising a motor vehicle and at least one towed vehicle, in particular for implementing external braking demands of the trailer axles, i.e., the axles of a trailer. The information regarding the present slip of a trailer axle is continuously ascertained from the measured speed values of the wheels of the relevant towed vehicle. The trailer axle having the highest rotational speeds is simultaneously the trailer axle having the least slip. In other words, the control axle is the trailer axle that, of all the trailer axles, likely must support the greatest axle load and, therefore, generally requires the greatest brake pressure for a desired deceleration of the vehicle.

A trailer differential slip value corresponding to the difference of the slip of the reference axle of the towing vehicle and the slip of the control axle of the towed vehicle is determined exclusively for the determined trailer axle having the least slip at the moment, which is to be referred to here as the control axle. The trailer differential slip value is readjusted, in particular controlled, by way of the adjustment of the brake pressure at the brakes of the towed vehicle (trailer brake pressure) according to embodiments of the invention.

At the wheel brakes of the trailer axle determined to be the control axle, the inlet valves of the particular pressure control valves remain open, i.e., are not controlled in order to be closed, and therefore the trailer brake pressure is adjusted exclusively at the relevant wheel brakes of the control axle. At the wheel brakes of the remaining trailer axles, the inlet valves of the particular pressure control valves are closed, i.e., controlled, after a start point according to the requirement of an external braking demand, and therefore no further pressure increase can take place for the time being. The closing of the pressure control valves advantageously takes place via the brake module of the towed vehicle. A certain start condition is advantageously predefined for the start point after the onset of the deceleration effect during a braking operation, for example a certain deceleration value, such as 1 m/s$^2$. Alternatively or additionally, the brake control unit of the towing vehicle signals to the brake module 66 of the towed vehicle an adaptation of the control signals in order to readjust the differential slip value, as the start condition. The brake control unit signals an active intervention by the supervision into the determination of the control signals for the towing vehicle, and the brake module of the towed vehicle registers a corresponding signal of the brake control unit of the towing vehicle, as the start condition. The determination of the control axle can take place even prior to the onset of the start condition, for example starting with the first reception of an external braking demand. The start condition is then generally available immediately at the start point of the method according to embodiments of the invention, as determined on the basis of filtered measuring signals of the speed sensors.

The slip at the control axle or a piece of slip information representing the slip, for example the rotational speed or the speed, is communicated to the brake control unit of the towing vehicle, which, on the basis of this information, takes over the determination, according to embodiments of the invention, of the trailer differential slip value with respect to the reference axle towing vehicle and the readjustment of the differential slip value toward a predefined setpoint value and determines appropriate brake pressures.

In one preferred embodiment of the invention, the notification of the information representing the slip at the selected control axle takes place according to the demand for braking power by the towing vehicle. Advantageously, the brake control unit of the towing vehicle informs the braking system of the towed vehicle via the activation of the determination of brake pressures under supervision according to embodiments of the invention, for example, by supplying an appropriate signal.

Due to the procedure according to embodiments of the invention for determining a control axle by exclusively readjusting the differential slip value at this control axle, an optimal compromise is reached between the need to improve the contribution of the wheel brakes of the towed vehicle to implementing the demanded setpoint deceleration of the vehicle combination, on the one hand and, on the other hand, the need to mix the braking systems of the component vehicles of the vehicle composition as little as possible, for safety reasons. In addition, the brake control unit of the towing vehicle need read in only a small amount of information from the towed vehicle for the determination of the brake pressures according to embodiments of the invention under supervision of the control signals for the pressure control valves involved. Only the rotational speed signals or slips of the wheels of the trailer axle determined to be the control axle, or even only one single rotational speed signal or one single slip representing the rotational behavior or braking behavior of both wheels of the control axle need be transmitted to the brake control unit of the towing vehicle.

The transmission of the information regarding the rotational behavior to the control axle takes place, in particular, via the CAN interface.

Many suboperations of the adjustment of the brake pressure at the trailer axles according to embodiments of the invention can take place by way of the braking system of the towed vehicle or its electronic brake module, for example the determination of the control axle on the basis of the rotational speed signals of the trailer axles.

A further undesirable increase in the braking force is prevented at the relevant trailer axle by the (temporary) closure of the inlet valves at the at least one further trailer axle (in addition to the trailer axle determined to be the control axle). The brake module of the towed vehicle can therefore automatically temporarily initiate a relative minimum braking, i.e., a braking effect of the own axles that is reduced with respect to the braking effect that takes effect in the normal braking mode (the driver brakes) and, therefore, is adapted according to slip criteria and, therefore, is optimized. A substantial gain in driving safety is therefore achieved.

Advantageously, the switching state of the inlet valves is monitored and the closed switching state of the inlet valves, i.e., the active control of the inlet valves, is concluded and, if necessary, is activated again depending on an evaluation of the time sequence of the difference of the slip of the particular trailer axle and the slip of the control axle having at least one predefined switching threshold for the trailer differential slip between the trailer axles. In the further temporal progression of the braking operation, proceeding from the point in time of the closure of the inlet valves of a trailer axle, if the differential slip of two trailer axles changes approximately continuously in the direction of a differential slip of zero, the switching state of closed inlet valves is retained.

A first switching threshold in the evaluation of the differential slip between a trailer axle and the control axle of the towed vehicle is advantageously specified as a reaching and exceeding of a zero line of the trailer differential slip by a tolerance slip value, for example a tolerance slip value of 0.5%.

In this case, the zero line corresponds to equalized slip conditions between the axles under consideration, i.e., the trailer differential slip is zero. A percentage tolerance slip value of, for example, 0.5%, relates to the definition of the slip in the dimension (auxiliary unit of measure) "percent" according to the formula (n1−n2)/n1×100%, wherein the variable "n" designates the rotational speed of an axle. Alternatively, instead of the rotational speed "n", the speed "v" of the wheels of an axle can be utilized in the formula. Therefore, the inlet valves of the pressure control valves of the relevant trailer axle, after having closed for the first time, are opened again for the first time at the start point when a differential slip of zero, i.e., the zero line, has been reached by the differential slip after the start point and, in addition, an absolute value of a differential slip corresponding to the tolerance slip value of, for example, 0.5% has been exceeded. If there is a continuously further increasing braking demand in the further temporal progression of the braking operation after the start point, the switching states of the inlet valves of the pressure control valves of the relevant trailer axle are each subsequently switched after the sign of the trailer differential slip changes when the tolerance slip value is reached, i.e., the inlet valves are alternately opened and closed again. The inlet valves are opened, in this case, when the trailer differential slip has the sign other than the sign that was present at the start point of the braking operation and, in addition, the zero line has been reached since the latest switching-state change and, in addition, has been exceeded by the tolerance slip value of, for example, 0.5%. The inlet valves are closed, however, when the trailer differential slip has the same sign as the sign that was present at the start point of the braking operation and the zero line has been reached since the latest switching-state change and, in addition, has been exceeded by the tolerance slip value of, for example, 0.5%.

In one particularly advantageous embodiment of the method, after the trailer differential slip has reached the first switching threshold, a tendency of the braking demand (external braking demand or resultant braking demand) is taken into account and, in the case of a decreasing braking demand, an expanded tolerance range for the trailer differential slip is specified and the inlet valves of the trailer axles, except for the control axle, are held closed until the expanded tolerance range is exited. The expanded tolerance range has, for example, twice the value of the tolerance slip value 80 on both sides of the zero line 86. In the further temporal course of the braking operation after the first switching threshold has been exceeded, the inlet valves of the relevant trailer axle are therefore opened, i.e., are not or are no longer actively controlled by the brake module of the towed vehicle, only when the braking demand (external braking demand or resultant braking demand) has increased since the most recent calculation cycle of the braking module of the towed vehicle. If this is not the case, i.e., the value of the braking demand has remained the same or has dropped, the inlet valves of the relevant trailer axle are continued to be held closed, i.e., are actively controlled by the brake module of the towed vehicle.

For the case in which the absolute value of the trailer differential slip increases after the inlet valves have closed, an initial value of the trailer differential slip at the point in time of the closure of the inlet valves is utilized as the second switching threshold. To this end, the present value of the trailer differential slip is registered and stored at the point in time of the closure of the inlet valves. The second switching threshold is determined as an increase in the initial value of the trailer differential slip at the point in time of the closure of the inlet valves by a predefined portion of the initial value or a predefined tolerance slip value. Due to this switching threshold, undesirable over-brakings are ruled out.

For the case of an absolute value of the trailer differential slip that decreases at least by the tolerance slip value, in the further temporal progression of the braking operation after the inlet valves have closed, it is not the second threshold value, but rather the initial value of the trailer differential slip at the start point of the closure of the inlet valves that is specified as the third switching threshold. Therefore, if the absolute value of the differential slip drops, at least temporarily, from the initial value of the trailer differential value that was present at the start point, i.e., the onset of a certain starting condition, in the direction of the zero line, preferably by at least the absolute value of the tolerance slip value of, for example, 0.5%, and increases again in the further course of the braking operation, the stored trailer differential slip at the point in time of the first closure of the inlet valves is specified as the third switching threshold. The third switching threshold has the same sign as the trailer differential slip at the start point. Therefore, if the absolute value of the trailer differential slip increases again after an initial decrease at least by the absolute value of the specified tolerance slip value and reaches the stored initial value of the trailer differential slip that was present at the start point, the closed switching state of the inlet valves at the relevant trailer axles is concluded. In this way, the situation is detected, in which the trailer differential slip initially decreases in the direction of zero, but a differential slip of zero is not reached and, subsequently, the value of the trailer differential slip that was present at the start point of the closure of the inlet valves is reached again. As a result, it is ruled out that the inlet valves remain closed for undesirably long time periods.

FIG. 1 shows an electrical-pneumatic diagram of a braking system 1 of a vehicle 2, namely a commercial vehicle. Electrical lines are represented by solid lines and pneumatic lines are represented by dotted lines. In the exemplary embodiment shown, the vehicle 2 comprises two axles, namely a front axle 3 and a rear axle 4, at each of which wheels 5 are disposed on both sides. A wheel brake 6 is assigned to each wheel 5 in order to decelerate the wheels 5. The wheel brakes 6 can be pneumatically actuated and each comprise a brake cylinder 7. The wheel brakes 6 apply a braking force on the rotating wheel 5 according to the pneumatic brake pressure present in the particular brake cylinder 7. Brake cylinders 7 comprising spring-loaded cylinders 8, which are used as a parking brake, are provided at the wheels 5 of the rear axle 4.

A brake pedal 9, which is coupled to a service-brake valve 10, is situated in the driver's cab of the vehicle 2. The driver of the vehicle 2 can switch pneumatic pressure through to the brake cylinders 7 by actuating the brake pedal 9 and, therefore, actuate the wheel brakes 6. To this end, the service-brake valve 10 controls pneumatic brake lines 11, 44 between the pressure medium supplies 12, 15 and the brake cylinders 7.

In the exemplary embodiment shown, the wheel brakes 6 of the front axle 3 are assigned to a shared first brake circuit 13, while the wheel brakes 6 of the rear axle 4 can be actuated via a second brake circuit 14. The first pressure medium supply 12 is assigned to the first brake circuit 13 in this case and is connected to the brake cylinder 7 of the front axle 3 via the brake line 11. The second brake circuit 14 of the rear axle 4 is supplied with pressure medium via a second pressure medium supply 15. The second brake circuit 14 is designed similarly to the first brake circuit 13, i.e., the brake line 44 between the second pressure medium supply 15 to the wheel brakes 6 of the rear axle 4 can be released via the service-brake valve 10 and, therefore, the brake pressure can be adjusted depending on the position of the brake pedal 9.

A pneumatically actuatable relay valve 16 is situated in the first brake circuit 13 and a relay valve 17 is similarly situated in the second brake circuit 14. The pneumatically actuatable relay valves 16, 17 are opened via the pneumatic pressure from the connected pressure medium supply 12, 15, respectively. If the service-brake valve 10 is opened, the relay valves 16, 17 switch the present brake pressure through to the connected wheel brakes 6. In a normal braking mode (reference number 18 in FIG. 3), the brake pressure in the wheel brakes 6 can be adjusted depending on the driver's braking demand 19. In the normal braking mode 18, therefore, the driver of the vehicle 2 has full control over the braking behavior of the vehicle 2 via the actuation of the brake pedal 9.

Assigned to each wheel brake 6 of the braking system 1 is a pressure control valve 20 which is electrically controlled by a brake control unit 21 in a pressure control mode (reference number 24 in FIG. 3) and is connected to the brake control unit 21 in a signal-transmitting manner in order to receive control signals 31, 32. The pressure control valves 20 of the wheel brakes 6 of the front axle 3 are situated in the first brake circuit 13 and the pressure control valves 20 of the rear axle 4 are situated in the second brake circuit 14. The pressure control valves 20 are each a combination of at least two solenoid valves, namely an inlet valve 22 and an outlet valve 23. The inlet valve 22 is used, in this case, in principle, for increasing the pressure and for holding the pressure in the brake cylinder 7, while the outlet valve 23 is opened in order to reduce the brake pressure and bleeds the particular connected brake cylinder 7. The inlet valve 22 and the outlet valve 23 are 2/2-way valves in the exemplary embodiment.

The brake control unit 21 is designed and configured, in this case, for automatically acting on the braking operation in the pressure control mode 24, independently of the driver's braking demand 19. To this end, the brake control unit 21 determines, on the basis of the information supplied thereto, control signals 31, 32 for the pressure control valves 20, in order to adjust the braking behavior of the individual wheel brakes 6. The brake control unit 21 determines control signals 31 for the inlet valves 22 and control signals 32 for the outlet valves 23 and controls the particular valves with the ascertained control signals 31, 32. The inlet valves 22 and the outlet valves 23 are controlled in a pulse-modulated manner. Therefore, the control signals 31, 32 correspond to a certain pulse pattern which the brake control unit 21 specifies for adjusting a particular brake pressure P.

In the normal braking mode 18, the inlet valves 22 are in the open position and the outlet valves 23 are in the closed position, and therefore the adjustment of the brake pressure P is not influenced.

In the pressure control mode 24, the brake control unit 21 takes over the adjustment of the brake pressure of the particular wheel brakes 6 by appropriately controlling the pressure control valves 20. Assigned to each brake circuit 13, 14 is an electrically actuatable activation valve 25 which can be actuated by the brake control unit 21. Each activation valve 25 is designed as a 3/2-way valve, whereby the pressure line behind the activation valve can be bled, as needed. In the pressure control mode 24, brake pressure is switched through to the pressure control valves 20 by controlling the activation valves 25. In the exemplary embodiment shown, the activation valves 25 each control a pressure line 26 from a third pressure medium supply 27 to the relay valves 16, 17. The relay valve 16 of the front axle 3 can therefore be actuated by actuating the activation valve 25 of the first brake circuit 13. Similarly, the relay valve 17 of the rear axle 4 is actuated by actuating the activation valve 25 of the second brake circuit 14.

The service-brake valve 10 and the activation valves 25 are each coupled via a double check valve 28 to the pneumatic control inlet of the relay valve 16, 17 of the particular brake circuit 13, 14.

The braking system 1 comprises an antilock braking system 33, the essential elements of which are the brake control unit 21, the pressure control valves 20 of the wheel brakes 6 as actuators of the antilock braking system 33, and speed sensors 29, the measuring signals 34 of which are utilized by the brake control unit 21 for determining the tendency of the wheels 5 to lock. The brake control unit 21 determines, on the basis of the measuring signals 34 of the speed sensors 29, information regarding dynamic state variables of the particular wheels 5, in particular the respective slip (reference number 34 in FIGS. 3 to 5), in order to deduce therefrom a tendency of the relevant wheel 5 to lock. When it is established that one or more of the wheels 5 has/have a tendency to lock, the antilock braking system 33, i.e., the brake control unit 21 which implements the antilock function, intervenes into the braking operation, in the pressure control mode 24, by controlling the brake pressure P at the relevant wheel brake 6.

By adjusting the brake pressures in the pressure control mode 24, the brake control unit 21 implements not only internal braking demands, which are specified on the basis of the dynamic state variables of the vehicle supplied thereto, but also external braking demands 30. The external braking demand 30 is specified by a driver assistance system. An external braking demand 30 is understood to mean, in this case, the demand for braking power by one or multiple driver assistance systems or other external systems which demand a braking maneuver due to their function in the vehicle 2. When an external braking demand 30 is received, the brake control unit 21 switches from the normal braking mode 18 into the pressure control mode 24 and takes over the control or regulation of the brake pressures P at the individual wheels 5.

If the external braking demand 30 is withdrawn, i.e., the brake control unit 21 no longer receives an external braking demand 30, the brake control unit 21 generally initiates a termination of the pressure control mode 24, provided there is no further brake demand present. When the pressure control mode 24 is terminated, the driver of the vehicle 2 therefore receives full control again over the actuation of the wheel brakes 6 in the normal braking mode 18.

The braking system 1 comprises a brake signal emitter 43 which is connected to the brake control unit 21 in a signal-transmitting manner. The output signal of the brake signal emitter 43 quantitatively corresponds to the driver's braking demand 19, wherein, for example, the position or an actuation travel of the brake pedal 9, an actuation travel of a component of the service-brake valve 10, or a brake pressure output by the service-brake valve 10 can be measured. The driver's braking demand 19 is communicated to the brake control unit 21 via the signal-transmitting connection. In this way, the brake control unit 21 is capable, in the pressure control mode 24, of taking an additional braking by the driver into account, i.e., an additional driver's braking demand 19 occurring simultaneously with the external braking demand 30. The output signal of the brake signal emitter 43 provides quantitative information regarding the driver's braking demand 19 to the brake control unit in the pressure control mode 24. In the exemplary embodiments according to FIGS. 3 to 5, an internal setpoint deceleration Z-int desired by the driver is specified to the brake control unit 21, on the basis of which the brake control unit 21 determines and adjusts the appropriate brake pressure P.

The brake control unit 21 takes both the driver's braking demand 19 and the external braking demand 30 into account in a method for determining the brake pressure P, which is described in the following with reference to FIG. 3.

Figure 4:
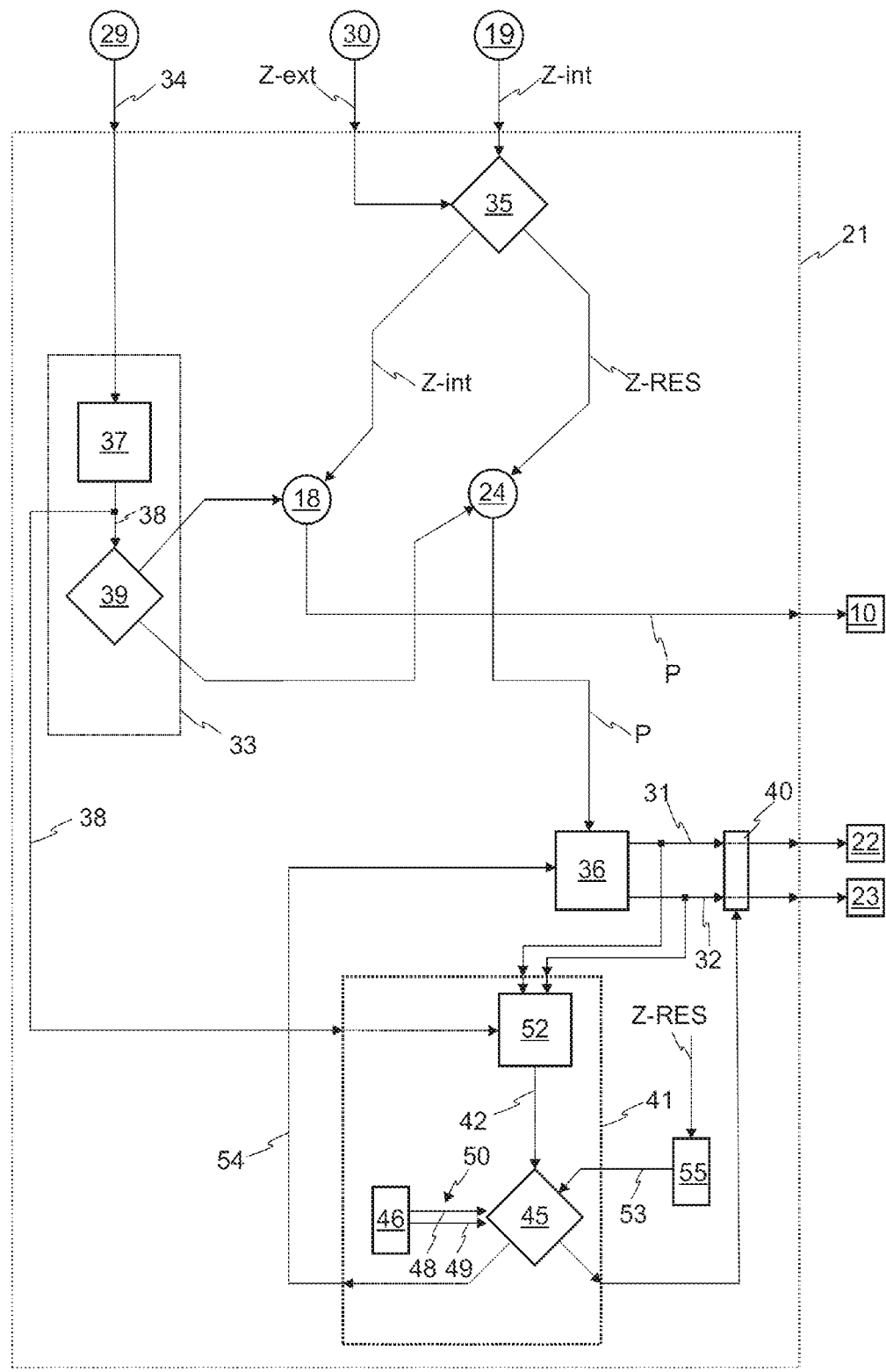
FIG. 4 shows a flow chart of a method according to a second embodiment for adjusting the brake pressures in a braking system according to FIG. 1 or 2.
Figure 5:
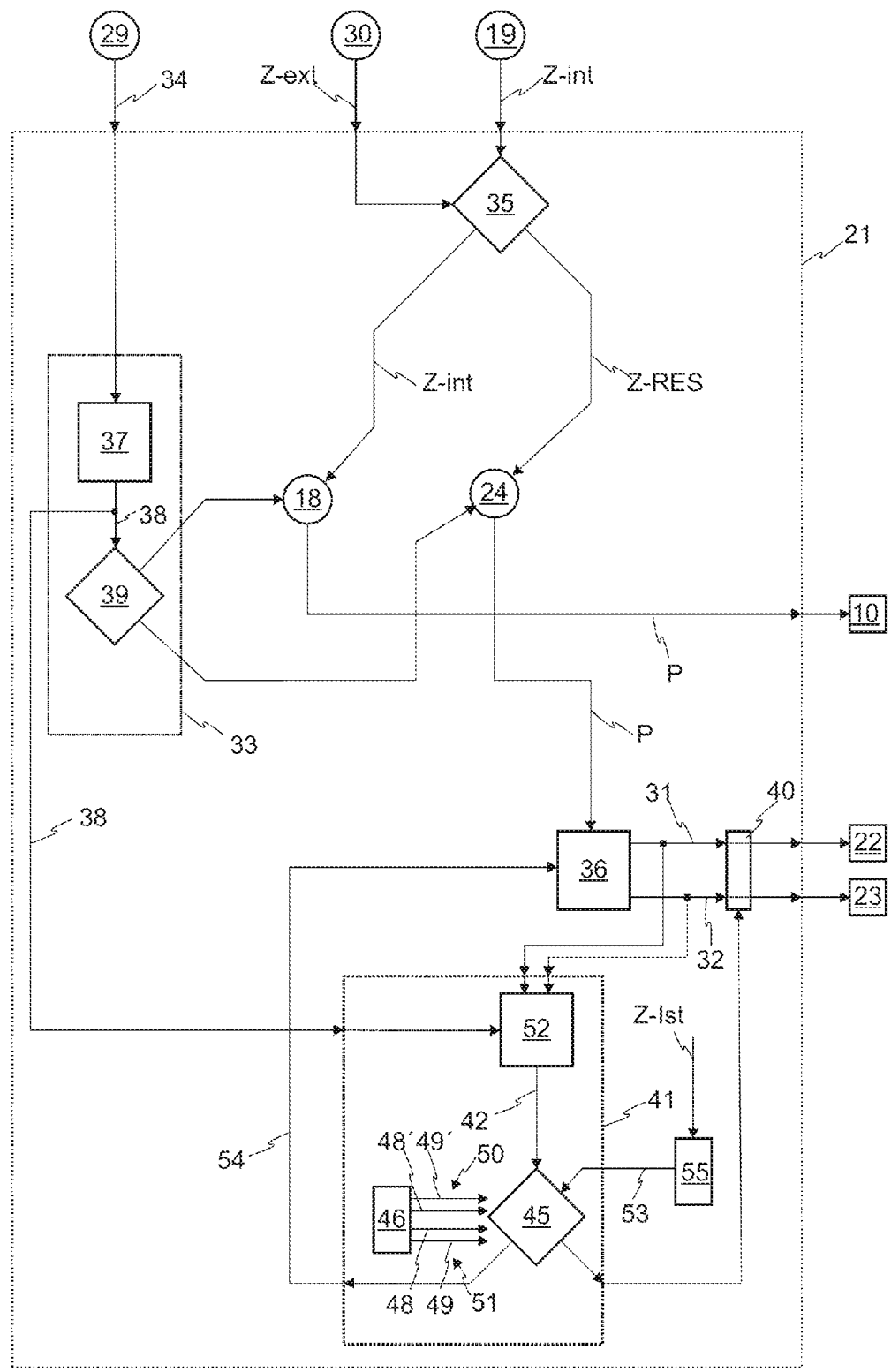
FIG. 5 shows a flow chart of a method according to a third embodiment for adjusting the brake pressures in a braking system according to FIG. 1 or 2.

In the normal operating mode 18, the brake pressure P alone is adjusted depending on the driver's braking demand 19. The driver's braking demand 19 is specified to the brake control unit 21 (FIG. 1) by means of a variable value representing the driver's braking demand 19. In the exemplary embodiment shown, the variable value is specified as an internal setpoint deceleration value Z-int. If the driver's braking demand is entered in a physical variable other than the external braking demand 30, the brake control unit 21 converts the value of these variables into a quantitatively corresponding setpoint deceleration value, and therefore internal and external braking demands are present in the same physical dimension and are easily linked. FIG. 3, FIG. 4, and FIG. 5 show flow charts of exemplary embodiments for adjusting the brake pressure P via a brake control unit 21.

In the normal braking mode 18, the braking system 1 (FIG. 1) adjusts the brake pressure P via actuation of the service-brake valve 10. If the brake control unit 21 receives an external braking demand 30, a switch to the pressure control mode 24 takes place. In a mode detection 35 for deciding between the braking modes, the brake control unit 21 takes the braking demands into consideration that are to be taken into consideration, namely the driver's braking demand 19 and the external braking demand 30. If there is no external braking demand 30, the brake pressure P at the wheel brakes is adjusted according to the driver's braking demand 19 in the normal braking mode 18. In the normal braking mode 18, the inlet valves 22 of the pressure control valves 20 remain open and the outlet valves 23 remain closed, whereby the driver of the vehicle 2 has full control over the braking maneuver.

If the brake control unit 21 receives an external braking demand 30, the brake control unit 21, in the pressure control mode 24, adjusts a brake pressure P at the wheel brakes 6 with consideration for the external braking demand 30 and, if necessary, a simultaneous driver's braking demand 19. If both an external braking demand 30 and a driver's braking demand 19 are present, for example when the driver additionally brakes during the pressure control mode 24, the brake control unit determines the brake pressure P to be adjusted while linking the driver's braking demand 19 and the external braking demand 30 to form a resultant braking demand 56.

The external braking demand 30 is specified to the brake control unit 21 as an external setpoint deceleration value Z-ext. The internal deceleration value Z-int is linked to the external deceleration value Z-ext to form a resultant deceleration value Z-RES, being added in the case of the exemplary embodiment.

After detection of the braking demands, i.e., either an exclusively external braking demand 30 having a setpoint deceleration value Z-ext or a resultant braking demand 56 comprising a driver's braking demand 19 and an external braking demand 30, a determination 36 of the control signals 31, 32 for the inlet valve 22 and the outlet valve 23, respectively, takes place, in order to adjust the brake pressure P according to the requirement of the brake control unit 21. In the determination 36 of the control signals 31, 32 for the pressure control valves 20 of the front axle 3 and the rear axle 4, further measurement and determination variables are taken into account in addition to the present braking demand Z-ext or Z-RES, for example the vehicle mass determined after the onset of the journey, an axle load ratio between the front axle 3 and the rear axle 4, a brake performance factor determined during braking operations carried out by the driver, which characterizes the individual brake performance at the particular wheel brake, or the mean braking power of all wheel brakes which are decelerating the vehicle. Due to the various influencing variables on the determination of the control signals, the control signals of the pressure control valves of the front axle 3 often deviate from those of the rear axle 4, also between individual wheels, for example in certain situations, such as an external braking demand.

The brake control unit 21 is a component of an antilock braking system 33 which evaluates the measuring signals 34 of the speed sensors 29, wherein a slip determination 37 takes place on the basis of the measuring signals 34. In the slip determination 37, the particular slip 38 for each wheel 5 of the vehicle 2 is determined. An activation 39 switches into the pressure control mode 24 when the determined slip 38 falls below a predefined slip limit. In this case, the slip limit represents the state of the relevant wheel, at which the wheel tends to lock. In an activation 39 of the antilock function, control signals 31, 32 for the inlet valves 22, 23 are generated in the pressure control mode 24 and the brake pressure P at the wheel 5 tending to lock is controlled along the slip limit.

If the brake pressure P is already adjusted in the pressure control mode 24 due to an external braking demand 30, the brake control unit 21 carries out a supervision 41 of the control signals 31, 32, with consideration for a differential slip value 42 before a release 40 of the control signals for the inlet valves 22 and the outlet valves 23. The supervision is explained in greater detail in the following. The differential slip value 42 corresponds to the difference of the slip 38 of two axles 3, 4 of the vehicle. In the determination of the differential slip values 42, either all slips 38 of the wheels (wheel slips) or all axle slips are considered, which represent the mean value of the wheel slips of the left and the right wheels of an axle, are directly read in for the supervision 41. If interaxle differential slip values 42 have already been determined for other driver assistance functions, these are advantageously utilized for the supervision 41.

In vehicles comprising more than two axles, multiple interaxle differential slip values 42 are determined and are utilized for the supervision 41. In this case, the differential slip values 42 are determined for multiple axles, relative to an axle taken into account in all axle pairs in each case. Such a reference axle, to which the differential slip values of all remaining axles relate, is preferably the front axle 3. The differential slip value 42 is determined in a difference determination 52 of the supervision 41 on the basis of the slip 38 of the particular axles 3, 4 of the vehicle under consideration. The information regarding the particular slip 38 is provided by the antilock function which constantly evaluates the measuring signals 34 of the speed sensors 29.

In the supervision 41, an evaluation 45 of the at least one differential slip value 42 takes place with consideration for a requirement 55 of a setpoint differential slip value 53. By adapting at least one control signal 31, 32, the differential slip value 42 is brought closer to the predefined setpoint differential slip value 53. Depending on the evaluation 45, the supervision 41 carried out in the brake control unit 21 releases the ascertained control signals 31, 32 for implementation at the inlet valves 22 or at the outlet valves 23 or adapts at least one control signal 31, 32 at at least one wheel brake of the axles taken into account in the supervision 41 for the purpose of readjustment with respect to a future reduction of the differential slip value 42. The supervision 41 considers the particular differential slip value 42 per axle or per brake circuit, i.e., separately for the front axle 3, rear axle 4, and for further brake circuits or axles of the vehicle. The evaluation 45 of the differential slip value 42 takes place on the basis of a comparison of the differential slip value 42 with the predefined setpoint differential slip value 53.

In the evaluation 45, a predefined control intervention criterion 46 is also taken into account, wherein the supervision 41 of the brake control unit 21 releases the control signals 31, 32 depending on the fulfillment of the control intervention criterion 46 or adapts at least one control signal 31, 32 for readjusting the differential slip value 42.

Figure 2:
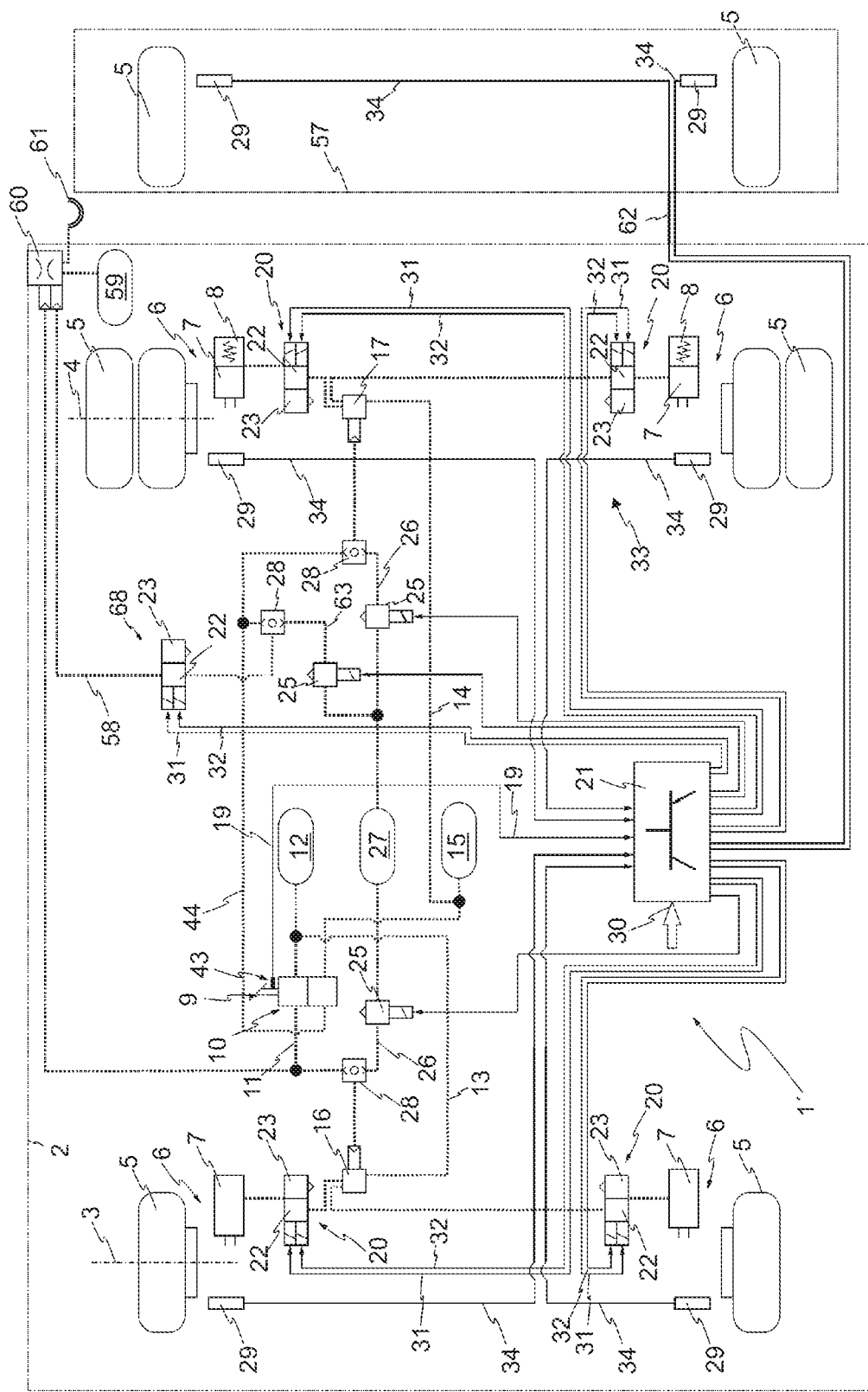
FIG. 2 shows a pneumatic and electrical diagram of a braking system of a vehicle combination comprising a towed vehicle.
Figure 3:
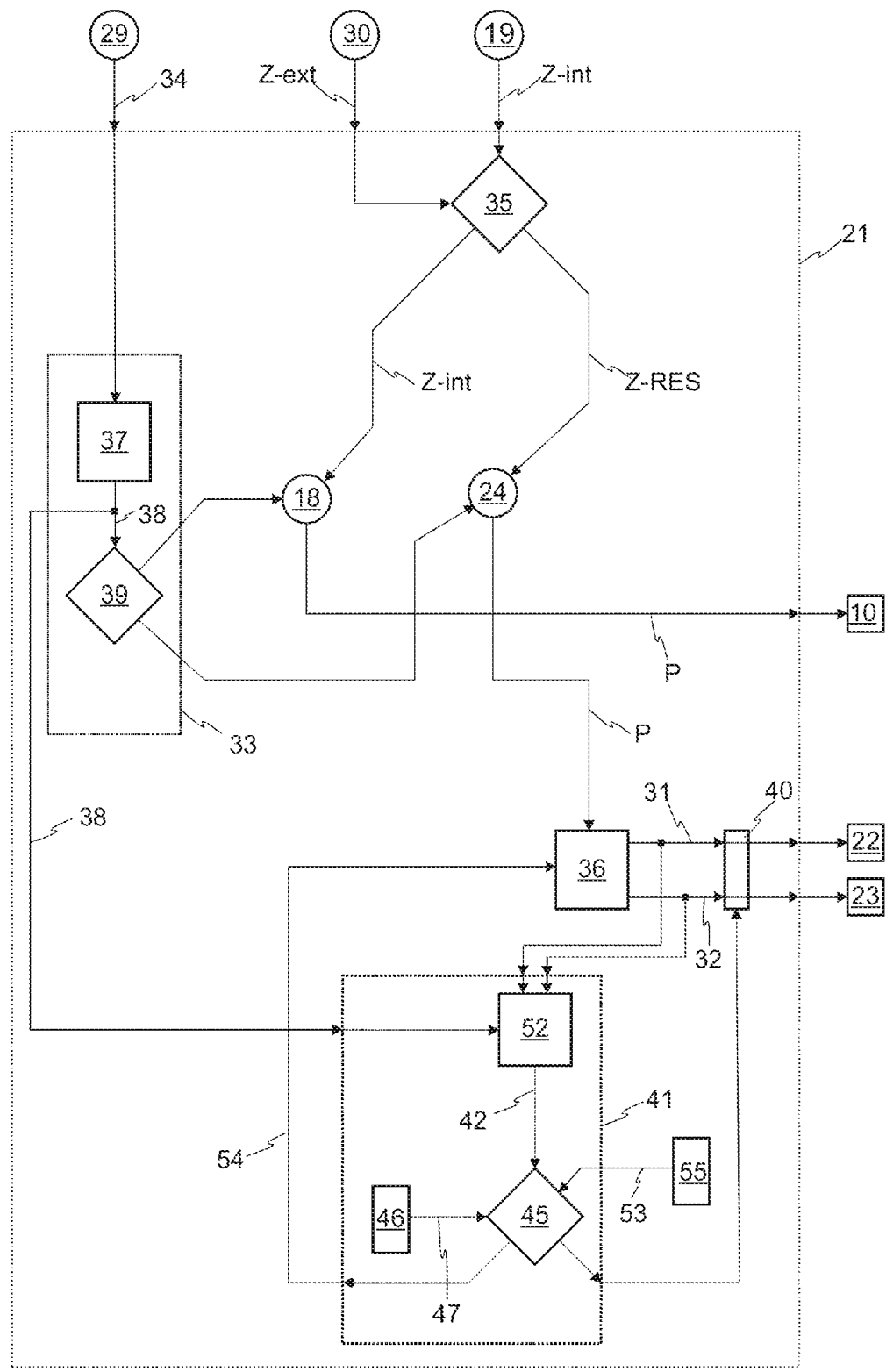
FIG. 3 shows a flow chart of a method according to a first embodiment for adjusting the brake pressures in a braking system according to FIG. 1 or 2.

In the exemplary embodiment according to FIG. 3, a slip threshold value 47 is specified to the evaluation 45 of the differential slip value 42 as the control intervention criterion 46. If the determined differential slip value 42 is below the predefined differential slip value 47, the supervision 41 switches the ascertained control signals 31, 32 for the implementation through to the inlet valves 22, 23. This is represented in FIG. 2 by way of the control of the release of the control signals 31, 32.

If the evaluation 45 of the differential slip value 42, as compared to the slip threshold value 47, yields a differential slip value 42 that is too great and reaches the slip threshold value 47 or is even greater than the slip threshold value 47, the supervision 41 prevents the release 40 of the present control signals 31, 32 and initiates a new determination 36 of the control signal or multiple control signals 31, 32. The determination 36 of control signals 31, 32 is provided with a piece of adaptation information 54 in this case, which, on the basis of the evaluation 45, indicates the tendency of which direction (increase or decrease) the brake pressure is to be adapted at certain wheel brakes in order to change the future differential slip value 42 as desired and to readjust a setpoint differential slip value 53. In every new determination of control signals 31, 32, a new cycle of the supervision 41 takes place, and therefore presently ascertained control signals 31, 32 are always evaluated before a release 40 for implementation.

In the adaptation of the control signals 31, 32 with respect to a reduction of the differential slip value 42, the control signal 31 of an inlet valve 22 of the relevant wheel brake is changed in order to increase the brake pressure P and/or the control signal 32 of an outlet valve 23 is changed in order to reduce the brake pressure P. The determination 36 of new, present control signals 31, 32 takes place in such a way, in this case, that the brake control unit 21 reduces the brake pressure at the axle of the compared pair of axles 3, 4 having the greater slip, with consideration for the evaluation 45 of the differential slip value 42. As a result, in the further course of a braking operation in the pressure control mode 24 due to an external braking demand 30, the axle having the relatively greatest slip 38 at the moment is spared, in that it need not perform any additional braking work or is relieved. The other brake circuits or the connected wheel brakes take over the implementation of the demanded braking power.

A differential slip value 42 that is too great indicates an over-braking of the axle under consideration, as compared to the reference axle. If the control signal considered in the supervision 41 or the determined pulse pattern is provided for controlling the inlet valve 22, a release 40 of the control signal 31 would result in the relevant axle proceeding even further into the over-braking state, which is prevented by the blocking and recalculation of the control signal 31 due to the supervision 41. In the exemplary case of a determined differential slip under consideration, if the determined pulse pattern is a control signal 32 for the outlet valve 23, the supervision 41 releases the pulse pattern for the implementation to the outlet valve 23.

In the exemplary embodiment according to FIG. 4, an upper slip threshold value 48 and a lower slip threshold value 49 are specified as the tolerance range 50, as the control intervention criterion 46 for the evaluation 45 of the differential slip value 42. An adaptation of the brake pressure distribution takes place by changing the control signals 31, 32 when the differential slip value 42 exceeds the upper slip threshold value 48 or falls below the lower slip threshold value 49. If the differential slip value exceeds the upper slip threshold value 48, the implementation of the pulse pattern (control signal 31) by the inlet valve 22 is blocked and recalculated. The same applies for the outlet valve 23, i.e., if the lower slip threshold value is fallen below, the release 40 for a pulse pattern (control signal 32) for the outlet valve 23 is blocked and recalculated. A tolerance range having a permissible differential slip is represented by way of the two parameters, namely the upper slip threshold value 48 and the lower slip threshold value 49.

With consideration for the predefined tolerance range 50, the differential slip value 42 within the tolerance range 50 is brought closer to the setpoint differential value 53 according to the requirement 55. The setpoint differential slip value 53 is advantageously specified depending on the setpoint deceleration Z-RES of the vehicle or the present vehicle deceleration Z-actual (see FIG. 5). Preferably, such a setpoint differential slip value 53 applies in the lower magnitude range of the vehicle deceleration that the rear axle 4 or one of the rear axles opposite the front axle 3 utilized as a reference axle has a greater slip 38. As the setpoint deceleration (or actual deceleration) increases, the setpoint differential slip is changed in the direction of an equalized differential slip between the rear axle 4 or the rear axles and the front axle 3. This means, the setpoint differential slip value 53 is increasingly reduced, if necessary until the value "zero" is reached or becomes less than zero, in the upper magnitude range of the vehicle deceleration.

FIG. 5 shows yet another exemplary embodiment of a method for adjusting the brake pressure P, wherein, in contrast to the exemplary embodiments according to FIG. 3 and FIG. 4, a first tolerance range 50 having slip threshold values 48, 49 is specified for a braking operation having active retarders and a second tolerance range 51 having slip threshold values 48', 49' is specified for a braking operation without retarders. Depending on whether a retarder is active at an axle of an axle pair under consideration with respect to the differential slip, or not, the particular tolerance range 50, 51 provided therefor is used as the basis for the supervision 41. Due to the provision with differently parameterized tolerance ranges 50, 51, it is possible to select whether, in the case of an active retarder, a higher upper differential slip value 48 is specified in the supervision 41, for example in order to reduce a nonsynchronous operation of the axle pair under consideration, due to wear of the brake pads.

The newly ascertained control signals 31, 32 or pulse patterns are also subject to the supervision 41 by the evaluation 45 of a differential slip value 42.

While a motor vehicle is represented in the exemplary embodiment according to FIG. 1, FIG. 2 shows an electrical-pneumatic diagram of a braking system 1' of a vehicle combination 64, in which a towed vehicle 57 is connected to the vehicle 2 utilized as the towing vehicle and its braking system is connected to the braking system of the towing vehicle. Electrical lines are represented by solid lines and pneumatic lines are represented by dotted lines. The design of the braking system 1' corresponds to the design of the braking system 1 of the vehicle 2 according to FIG. 1, except for the following particularities.

A third brake circuit 63 comprising a fourth pressure medium supply 59 is configured for activating the braking system of the towed vehicle 57. Similarly to the first brake circuit 13 and the second brake circuit 14, the third brake circuit 63 comprises a trailer pressure control valve 68, a double check valve 28, and a 3/2-way valve 25. The trailer pressure control valve 68 of the third brake circuit 63 or its inlet valve 22 and outlet valve 23 can be controlled by the control unit 21. In contrast to the first brake circuit 13 and the second brake circuit 14, a brake pressure line 58 behind the trailer pressure control valve 68 is connected to a trailer control valve 60, which controls the connection between the fourth pressure medium supply 59 and a pneumatic coupling head 61. The braking system of the towed vehicle 40 can be coupled to the coupling head 61. In the exemplary embodiment shown, the braking system of the towed vehicle 57 is supplied from the fourth pressure medium supply 59 via the precontrol of the trailer control valve 60.

The brake control unit 21 is connected to the braking system of the towed vehicle 57 via a CAN interface 62 and, in the exemplary embodiment, detects the measuring signals 34 of the speed sensors 29 at the wheels 5 of the towed vehicle 57. The brake control unit 21 of the towing vehicle immediately registers the measuring signals 34 of the speed sensors 29 of wheels 5 of the towed vehicle 57.

In further exemplary embodiments, the towed vehicle 57 comprises a separate control unit, in addition to the brake control unit of the towing vehicle. Via the CAN interface 62 between the towed vehicle 57 and the vehicle 2 which is a towing vehicle in this case, the control unit of the towed vehicle 57, which is not shown in FIG. 5, transmits a speed signal toward the towing vehicle, for example the towed vehicle reference speed which was determined by a control unit of the towed vehicle 57 on the basis of all available measuring signals 34 of speed sensors 29 of the towed vehicle 57. Alternatively, a towed vehicle axle speed is determined and is transmitted to the brake control unit 21; this is the speed of the wheels of a certain selected axle of the towed vehicle 57. In other words, this axle speed is determined on the basis of the measuring signals 34 of the speed sensors 29 of the relevant axle of the towed vehicle 57. In this case, the relevant axle of the towed vehicle 57 is an axle of the towed vehicle 57 that is representative of the deceleration effect of the towed vehicle 57. This is advantageously the front axle in the case of a fifth-wheel towed vehicle, or it is the middle of the three axles in the case of a three-axle semitrailer.

The brake control unit 21 of the towing vehicle determines brake pressures for the towed vehicle 57 and controls the pressure control valves of the wheel brakes of the towed vehicle 57 via control signals according to the wheel brakes of the towing vehicle; see FIG. 3 to FIG. 5. In this case, the brake control unit 21 carries out the above-described supervision 41 of the control signals and brings a differential slip value closer to a setpoint differential slip value. The differential slip value in this case corresponds to the difference between the slip of one axle of the towed vehicle 57 or its wheels 5 and the slip at the reference axle of the system, namely the front axle 3 of the towing vehicle in the exemplary embodiment.

Figure 6:
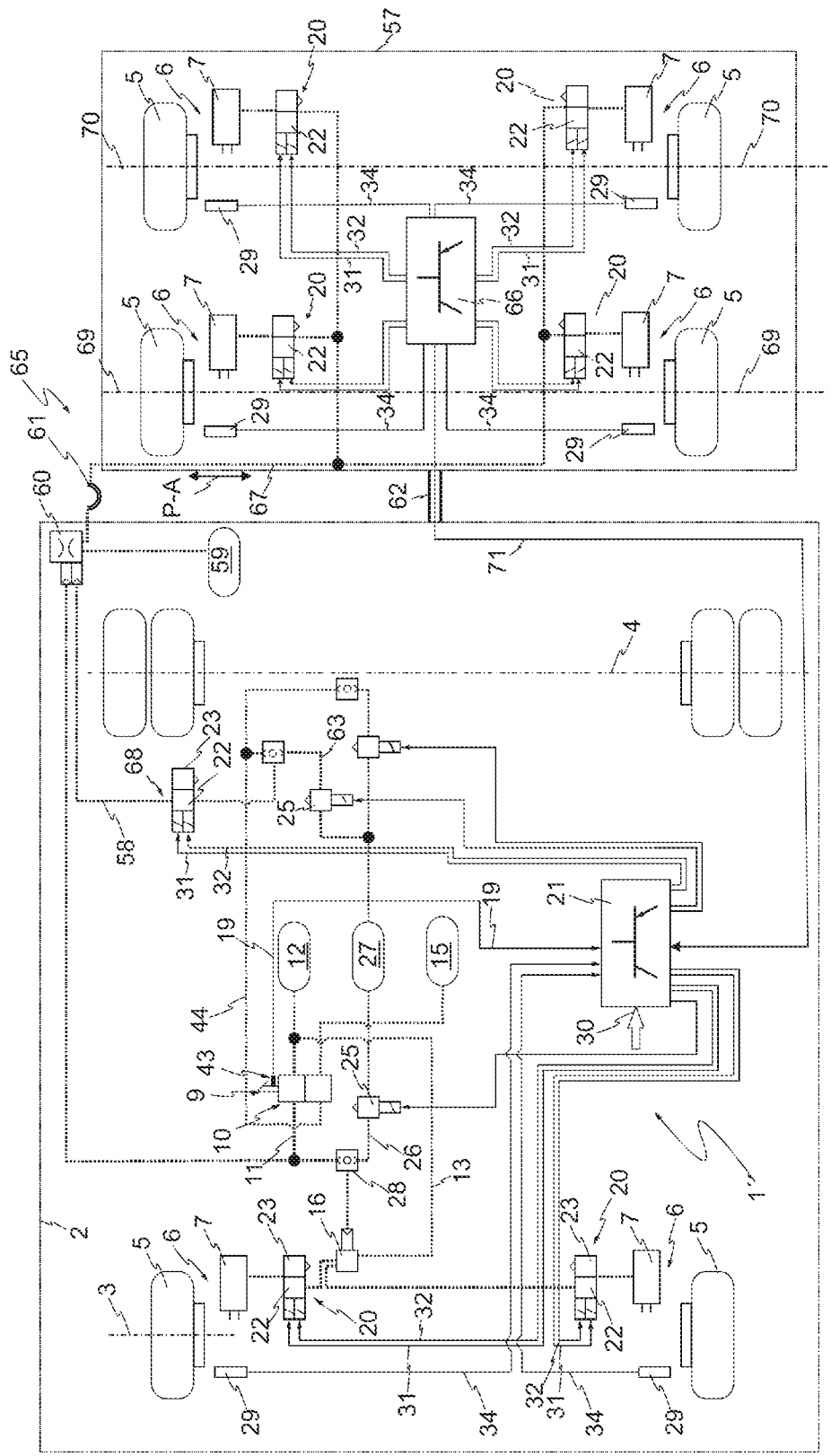
FIG. 6 shows a pneumatic and electrical diagram of a braking system of a vehicle combination comprising a towed vehicle.

FIG. 6 shows an electrical-pneumatic diagram of a braking system 1' according to an embodiment of the invention for a vehicle combination 65 comprising a preceding vehicle 2, as the towing vehicle, and one or multiple towed vehicles 57. Electrical lines are represented by solid lines and pneumatic lines are represented by dotted lines. Unless described otherwise in the following, the braking system 1" corresponds to the braking system according to FIG. 2.

The towed vehicle 57 comprises a braking system including a brake module 6 and wheel brakes 6, comprising one pressure control valve 20 in each case, which can be controlled by the brake module 66 independently of the brake control unit 21 of the towing vehicle. To this end, the brake module 66 registers the speeds of the wheels 5 via particular speed sensors 29 and autonomously carries out an antilock function.

The pressure control valves 20 of the towed vehicle 57 are connected to a shared brake pressure line 67, in which a certain trailer brake pressure P-A prevails. The trailer brake pressure P-A can be adjusted via the trailer pressure control valve 68 which is situated in the towing vehicle 2 ahead of the trailer control valve 60, wherein the trailer pressure control valve 68 can be controlled by the brake control unit 21. Therefore, the brake control unit 21 controls the trailer brake pressure P-A via the trailer pressure control valve 68 and the trailer control valve 60, in the connection between the trailer control valve 60 and the fourth pressure medium supply 59 which is provided for the towed vehicle 57.

The brake module 66 determines, from the speeds of the wheels 5 of the towed vehicle 57, the trailer axle 69, 70 having the least slip 38 at the moment, for example the front axle of the towed vehicle 57. A piece of information 71 representing the slip 38 at the control axle 69, which is selected in this way, is communicated by the brake module 66 to the brake control unit 21 via the CAN interface 62.

Figure 7:
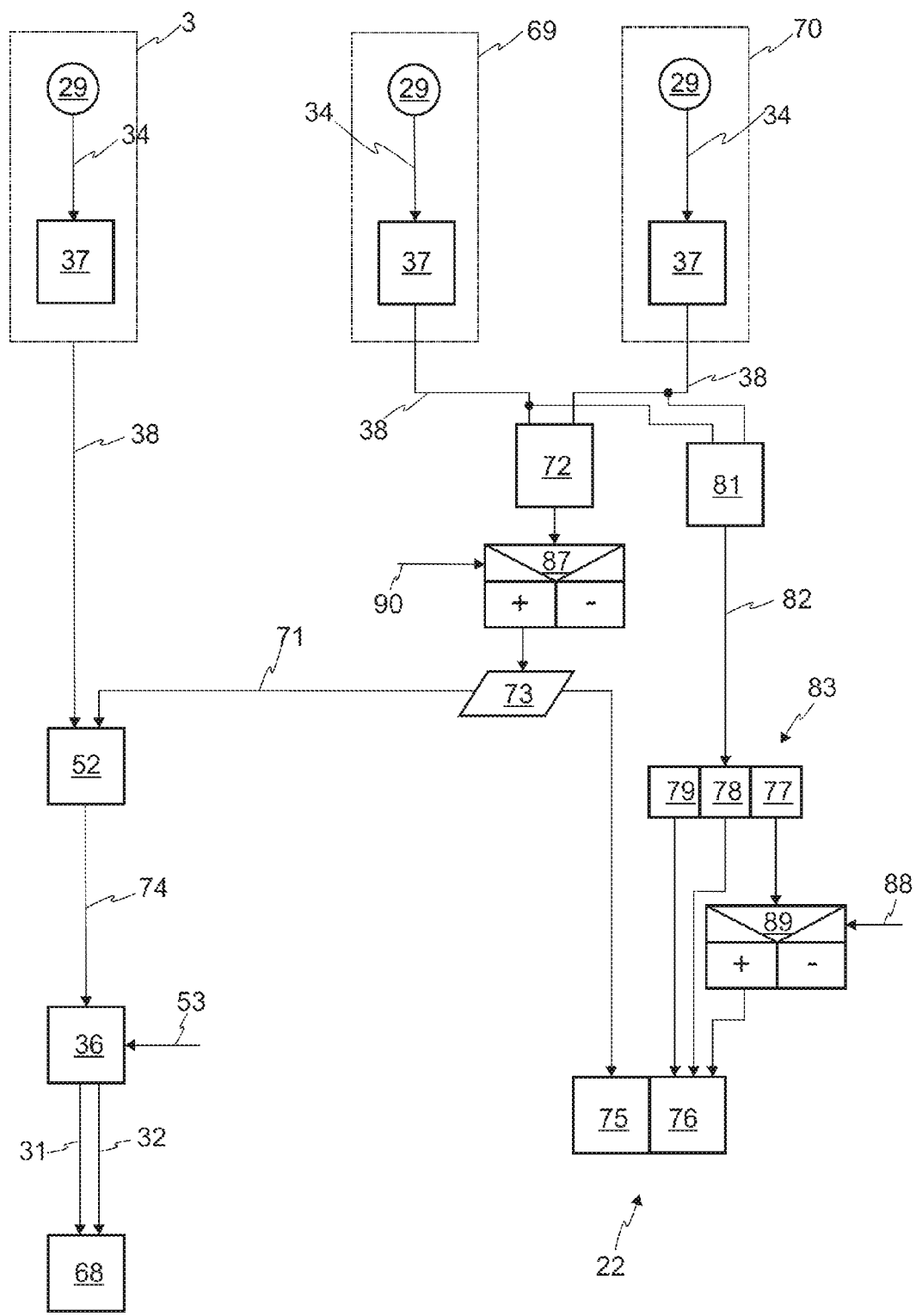
FIG. 7 shows a flow chart of a method according to an embodiment for adjusting the brake pressures in a braking system according to FIG. 6.

The adjustment of the brake pressures P-A at the wheel brakes 6 in the towed vehicle 57 is explained in greater detail in the following with reference to FIG. 7. In this case, a slip determination 37 takes place on the basis of the measuring signals 34 of the speed sensors 29 situated on the front axle 3, in a manner described above for the reference axle, which is generally the front axle 3 of the towing vehicle. For the towed vehicle 57, corresponding slip determinations 37 are carried out for the trailer axles 69, 70.

On the basis of the slips 38 determined in this way for the trailer axles 69, 70, in a comparison 72 of the slips 38, the trailer axle 69 having the least slip 38 is determined as the control axle 69. This is the front trailer axle in the exemplary embodiment according to FIG. 7. The slip 38 of the control axle 69 is the information 71 which is communicated to the brake control unit 21 of the towing vehicle.

With the information 71 regarding the slip 38 at the control axle 69, the brake control unit 21 carries out the difference determination 52, i.e., it determines a trailer differential slip value 74 as the difference between the slip 38 at the control axle 69 and the slip 38 at the front axle 3 of the towing vehicle, which is assumed to be the reference axle. The trailer differential slip value 74 is brought closer to a predefined setpoint differential slip value 53 similarly to the readjustment of the differential slip values 42 described above with reference to FIG. 3. Within the scope of this control, the brake control unit 21 varies the trailer brake pressure P-A in the determination 36 of control signals and controls the trailer pressure control valve 68, which is situated in the towing vehicle 2 ahead of the trailer control valve 60, with appropriate control signals 31, 32. The trailer brake pressure P-A determined in this way is finally available at the trailer control valve 60.

After a predefined start condition 87 occurs, the brake module 66 of the towed vehicle 57 also initiates a signal output 73 for switching the inlet valves 22 of the pressure control valves 20 on the other trailer axles, namely the rear trailer axle 70 in the exemplary embodiment, into the closed switching state 75. In the exemplary embodiment shown, the start condition 87 for the brake module 66 of the towed vehicle is the reception of an information signal 90 of the brake control unit 21 of the towing vehicle, with which the brake control unit 21 indicates, to the brake module 66 of the towed vehicle 57, the beginning of the regulation of the differential slip values. The brake control unit 21 therefore signals an active intervention by the supervision (reference number 41 in FIG. 3 to FIG. 5) into the determination 36 of control signals. In further advantageous exemplary embodiments, alternatively or additionally, the occurrence of a certain deceleration effect on the vehicle combination 65, for example, approximately 1 m/s$^2$, is registered as the start condition 87. If the predefined start condition 87 is met, the brake module 66 of the towed vehicle 57 closes the inlet valves 22 of the trailer axle 70 presently running with greater slip, and monitors the switching state thereof.

Within the scope of the comparison 72 of the slips 38 of the trailer axles 69, 70, a differential determination 81 of these slips 38 takes place, i.e., an interaxle trailer differential slip 82 is determined. The temporal progression of the trailer differential slip 82 is monitored with respect to a change 76 of the switching state 75 of the inlet valves 22 at the rear trailer axle 70, i.e., the termination of the active control of the pressure control valves 20 or their inlet valves 22. The closed switching state 75 of the inlet valves 22, i.e., the active control of the pressure control valves 20 or their inlet valves 22, is concluded in this case and is activated again depending on an evaluation 83 of the temporal progression of the interaxle trailer differential slip 82 having at least one switching threshold 77, 78, 79 of the trailer differential slip 82.

Figure 8:
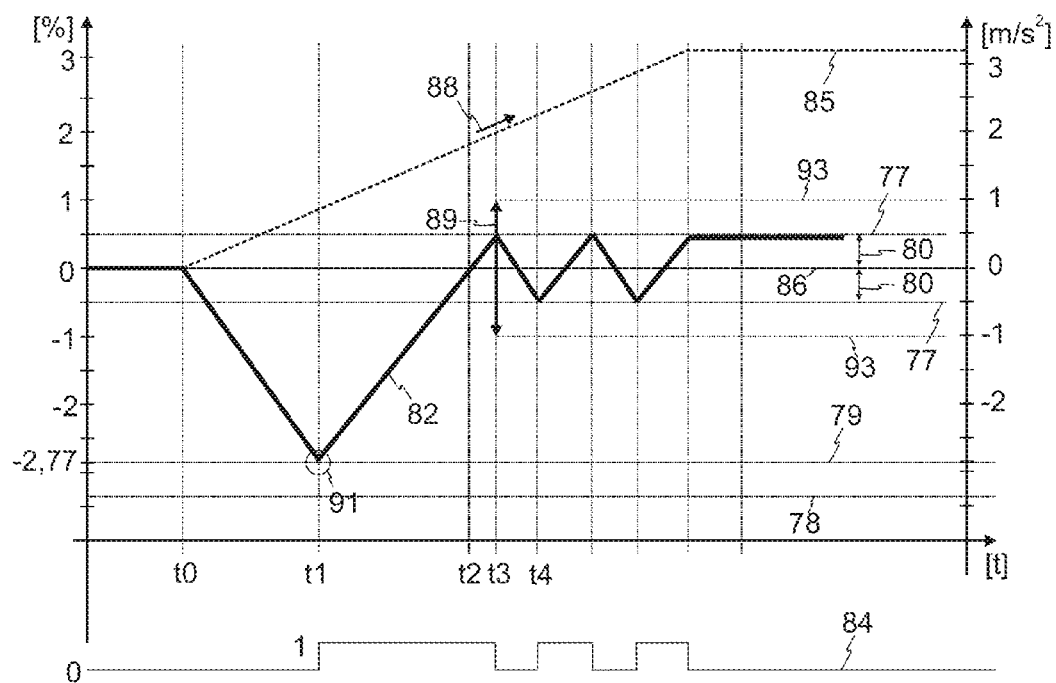
FIGS. 8, 9, and 10 show exemplary progressions of the differential slip value over time during the operation of a braking system according to FIG. 6.
Figure 9:
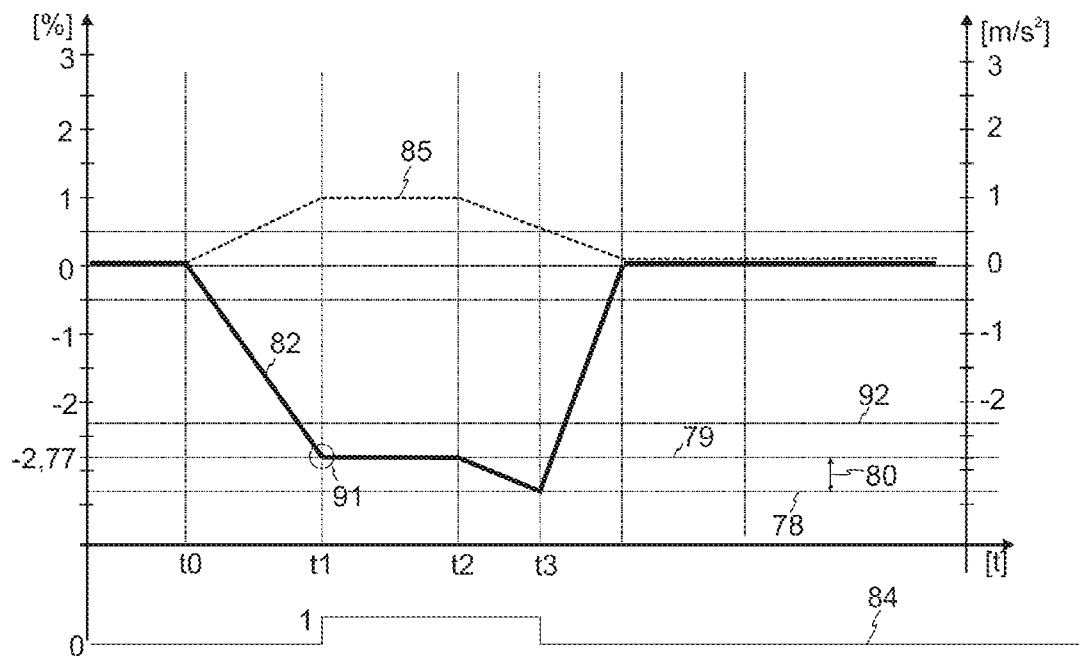
Figure 10:
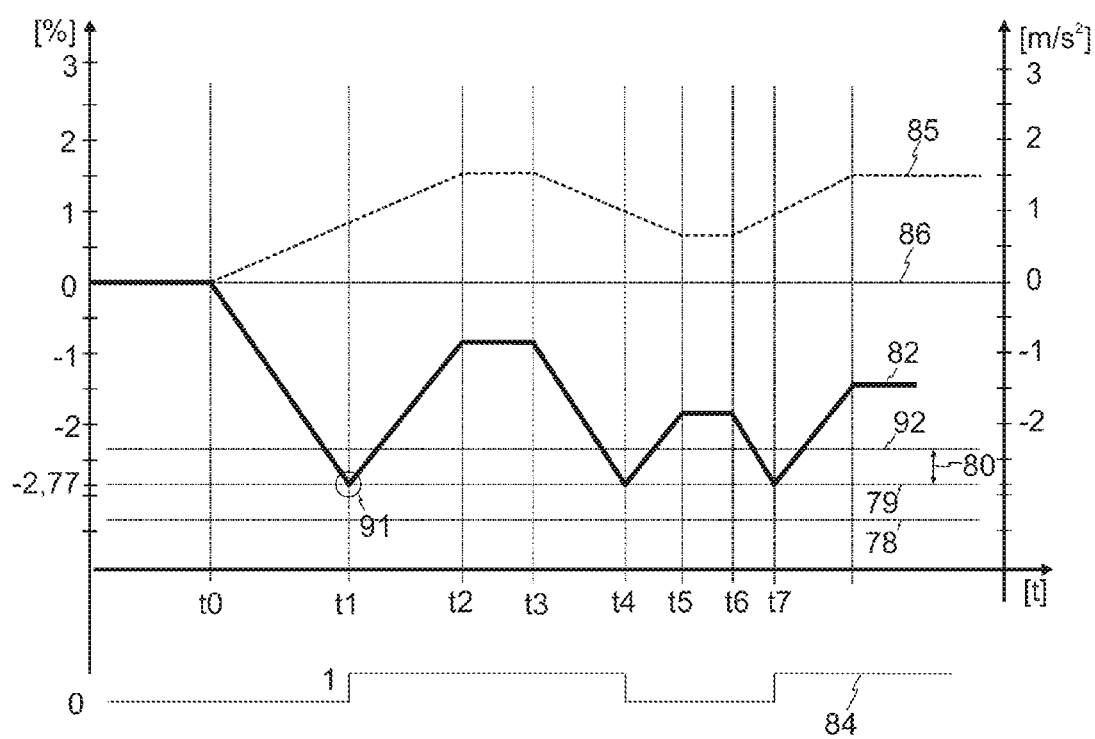

In the exemplary embodiment shown, three switching thresholds 77, 78, 79 are predefined for different situations and are described in the following with reference to FIG. 8 to FIG. 10. FIG. 8, FIG. 9, and FIG. 10 each show a graphical progression of the trailer differential slip 82 in its auxiliary dimension [%], as defined. The graph 84 corresponds to the switching states (reference number 75 in FIG. 7) of the inlet valves 22 at the rear trailer axle 70. The switching state "0" corresponds to the open switching state, while the closed switching state is indicated with "1". The graph 85 qualitatively represents the temporal progression of the demanded vehicle deceleration in the sense of negative acceleration requirements in the dimension [m/s$^2$], i.e., setpoint values corresponding to the external braking demand 30 or the resultant braking demand 56.

The point in time t0 corresponds to the beginning of a braking deceleration according to an external braking demand. At the start point t1, the start condition 87, which can be registered by the brake module 66, is met, i.e., in the exemplary embodiment shown, the brake module 66 receives an information signal 90 of the brake control unit 21, at start point t1, for display of the supervision 41 with adaptation of the control signals for the readjustment of the differential slip value (reference number 42 in FIG. 3 to FIG. 5) by supplying an appropriate information signal 90.

After the brake module 66 of the trailing vehicle 57 closes the inlet valves 22, for the first time, of the trailer axle 70 presenting running with greater slip, after fulfillment of the start condition 87 at the start point t1, the predefined switching thresholds 77, 78, 79 are taken into account in the monitoring of the switching states of the inlet valves. The switching thresholds 77, 78, 79 are threshold values which are explained in greater detail in the following, and with which the present trailer differential slip is compared. In the determination of the threshold values, tolerance slip values 80 predefined in the dimension (auxiliary unit of measure) of the differential slip (percent) are taken into account, for example are added.

The tolerance slip value 80 is 0.5%, for example. In this case, the tolerance slip value relates to the definition of the slip in the dimension (auxiliary unit of measure) "percent" according to the formula $(n1-n2)/n1 \times 100\%$, wherein the variable "n" designates the rotational speed of an axle.

For the monitoring and, if necessary, changeover 76 of the switching states of the inlet valves 22 of the trailer axle 70, the trailer differential slip 82 and the switching thresholds 77, 78, 79 are determined as criteria, i.e., in particular also the tolerance slip values 80 utilized for the qualitative determination of the switching thresholds 77, 78, 79.

FIG. 8 illustrates the monitoring of an exemplary progression of the trailer differential slip 82 with respect to a first switching threshold 77. In this case, a reaching and exceeding of a zero line 86 of the trailer differential slip 82 by a tolerance slip value 80 is monitored as the switching threshold 77.

At the point in time t2, all vehicle axles 69, 70 of the towed vehicle 57 have the same rotational speeds or speeds and, therefore, slips, and therefore the trailer differential slip 82 has reached the zero line 86.

At the point in time t3, the trailer differential slip 82 reaches the predefined first switching threshold 77, i.e., it exceeds the zero line 86 by the predefined tolerance slip value 80 of 0.5%, and therefore a switching-state changeover for the relevant inlet valves 22 takes place. The brake module 66 of the towed vehicle 57 opens the inlet valves 22, which have been closed so far, of the rear trailer axle 70 again or ends their temporary closure, and therefore the brake pressure in the brake cylinders 7 of the rear trailer axle 70 begins to increase. The increase in the brake pressure in the brake cylinders 7 of the rear trailer axle 70, which sets in due to a controlled opening of the inlet valves 22 of the rear trailer axle 70, increasingly shifts the ratio of the rotational speeds, speeds, and slips between the control axle 69 and the rear trailer axle 70 and, in the case of a constant increase of the braking demand (graph 85), constantly in the direction of an over-braking of the rear trailer axle 70 in relation to the control axle 69 of the towed vehicle 57, and therefore, as the braking demand continues to increase (graph 85), the trailer differential slip 82 reaches and falls below the zero line 86 again.

At the point in time t4, the trailer differential slip 82 reaches the first switching threshold 77 (tolerance slip value 80) again, due to the further increase in the external braking demand according to graph 85 and the controlled openings of the inlet valves 22 of the trailer axle 70, although with a different sign than at the point in time t3, but absolute value, and therefore a changeover of the switching states takes place again and the inlet valves 22 of the trailer axle 70 are closed again.

In the exemplary embodiment shown, the braking demand is additionally evaluated according to the graph 85 for the monitoring and, if necessary, changeover 76 of the switching states of the inlet valves 22 of the trailing axle 70. A tendency 88 of the present braking demand, i.e., the external braking demand 30 or the resultant braking demand 56 comprising an external braking demand 30 and a driver's braking demand 19, is taken into account in a decision regarding the requirement of an expanded tolerance range 89 after the first switching threshold 77 has been reached. The expanded tolerance range 89 is specified to be twice as great, for example, as the tolerance slip value 80 according to the switching threshold 77, i.e., 1 m/s$^2$, for example, on both sides of the zero line 86 in this case. If a tendency 88 toward an increasing braking demand is determined, as in the exemplary progression according to the graph 85, a changeover of the switching state of the inlet valves takes place due to the first switching threshold 77 having been reached, i.e., at the point in time t3, the inlet valves, which have been closed so far, are no longer controlled in a closing manner. At the point in time t4, a changeover of the switching state takes place again, since the first switching threshold 77 has been reached, and the inlet valves are closed.

In the case corresponding to the tendency 88 of a decreasing braking demand 30, 56, the expanded tolerance range 89 for the trailer differential slip 82 is specified and the inlet valves 22 of the trailer axles 70, except for the control axle 69, are held closed until the expanded tolerance range 89 is exited, i.e., until the expanded switching thresholds 93 determined by the tolerance range 89 have been reached or exceeded.

FIG. 9 illustrates the monitoring of an exemplary progression of the trailer differential slip 82 with respect to a second switching threshold 78. For the determination of the second switching threshold 78, reference is made to an initial value 91 of the trailer differential slip 82, which is stored at the start point t1 of the closure of the inlet valves 22, for example an initial value of −2.77%, as indicated in FIG. 9. The initial value 91 is specified, in addition to a tolerance slip value 80, as the second switching threshold 78 and is utilized for monitoring the switching states of the inlet valves 22 and decisions regarding the changeover (reference number 76 in FIG. 7) of their switching states. The second switching threshold 78 reliably prevents a further increase in the under-braking of the control axle 69 in relation to the braking effect of the trailer axle 70 beyond the value of the tolerance slip value 80. The second switching threshold 78 is configured for the case in which the absolute value of the trailer differential slip 82 between the trailer axles 69, 70 increases after the closure of the inlet valves at the point in time t1, without an approach by the trailer differential slip 82 to the zero line 86, proceeding from the initial value 91, by at least the value of the tolerance slip value 80, having previously taken place, at least temporarily. At the point in time t3, the trailer differential slip 82 reaches the predefined second switching threshold 78 corresponding to the tolerance slip value 80 taken into account therefor. When the second switching threshold 78 is reached, the brake module 66 of the towed vehicle 57 again opens the inlet valves 22 of the rear trailer axle 70, which have been closed so far, or ends the active control in the sense of a closure of the inlet valves. In further exemplary embodiments, the second switching threshold 78 is set as the sum of the stored initial value 91 and a portion of the initial value 91 of the trailer differential slip 82 at the point in time t1 of the closure of the inlet valves 22.

FIG. 10 illustrates the monitoring of an exemplary progression of the trailer differential slip 82 with respect to a third switching threshold 79, wherein the stored initial value 91 of the trailer differential slip 82 is predefined at the start point t1. The third switching threshold 79 is predefined for the case in which the absolute value of a trailer differential slip 82 decreases, wherein, in contrast to the area of application of the second switching threshold 78, the absolute value of the trailer differential slip 82 has temporarily decreased since the start point, by at least one tolerance slip value 80. In other words, the third switching threshold 79 is applied instead of the second switching threshold 78, i.e., the initial value 91 without the supplement provided in the second switching threshold 78, provided the absolute value of the trailer differential slip 82 had already decreased, despite the presently increasing tendency, by a certain extent, namely by the absolute value of the tolerance slip value 80 of approximately 0.5%. The supplement to the initial value 91 for determining the switching threshold is therefore dispensed with as soon as the decreasing absolute value of the trailer differential slip value 82 falls below the limit 92 determined by the tolerance slip value 80. In this way, the controllability of the inlet valves, which are in the closed switching state, is ensured for cases in which an approach to the zero line 86 takes place by at least the tolerance slip value 80, but an equalized trailer differential slip 82 due to the zero line 86 having been reached or exceeded, does not.

The third switching threshold 79 detects braking situations, in which the zero line 86, i.e., the state of an interaxle, equalized slip behavior, is not reached and, therefore, the first switching threshold 77 cannot be reached. If the absolute value of the trailer differential slip 82 increases again, starting both at the point in time t3 and at the point in time t6 in the exemplary embodiment, the switching state of the relevant inlet valves, except for the valves of the control axle, are switched when the initial value 91 utilized as the switching threshold 79 for the comparison with the present trailer differential slip 82 is reached.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1. braking system
2. vehicle
3. front axle
4. rear axle
5. wheel
6. wheel brake
7. brake cylinder
8. spring-loaded cylinder
9. brake pedal
10. service-brake valve
11. brake line
12. pressure medium supply
13. first brake circuit
14. second brake circuit
15. second pressure medium supply
16. relay valve
17. relay valve
18. normal braking mode
19. driver's braking demand
20. pressure control valve
21. brake control unit
22. inlet valve
23. outlet valve
24. pressure control mode
25. 3/2-way valve 26. pressure line
27. third pressure medium supply
28. double check valve
29. speed sensor
30. external braking demand
31. control signal—inlet valve
32. control signal—outlet valve
33. antilock braking system
34. measuring signal
35. mode detection
36. determination
37. slip determination
38. slip
39. activation
40. release
41. supervision
42. differential slip value
43. brake signal emitter
44. brake line
45. evaluation
46. control intervention criterion
47. slip threshold value
48. upper slip threshold value
49. lower slip threshold value
50. tolerance range
51. tolerance range
52. difference determination
53. setpoint differential slip value
54. adaptation information
55. requirement
56. resultant braking demand
57. towed vehicle
58. brake pressure line—trailer
59. fourth pressure medium supply
60. trailer control valve
61. coupling head
62. CAN interface
63. third brake circuit
64. vehicle combination
65. vehicle combination
66. brake module
67. brake control line
68. trailer pressure control valve
69. control axle
70. trailer axle
71. information
72. comparison
73. signal output
74. trailer differential slip value
75. switching state
76. changeover
77. first switching threshold
78. second switching threshold
79. third switching threshold
80. tolerance slip value
81. difference determination
82. trailer differential slip
83. evaluation
84. graph
85. graph
86. zero line
87. start condition
88. trend
89. tolerance range
90. information signal
91. initial value
92. limit
93. expanded switching threshold
P brake pressure
P-A trailer brake pressure
$Z_{int}$ internal deceleration value
$Z_{ext}$ external deceleration value
$Z_{RES}$ resultant deceleration value
$Z_{ist}$ actual deceleration
$t1$ start point
$t0$-$t7$ point in time

The invention claimed is:

1. A method for adjusting brake pressures at pneumatically actuated wheel brakes of a vehicle, wherein the brake pressures at the wheel brakes are adjusted in a normal braking mode depending on a driver's braking demand determined by a driver of the vehicle, and wherein, when an external braking demand independent of the driver's braking demand is received and/or when certain wheels tend to lock, a brake control unit takes over adjustment of the brake pressures in a pressure control mode, wherein the brake control unit, in the pressure control mode, ascertains control signals for pressure control valves of the particular wheel brakes and changes the brake pressures of the relevant wheel brake by controlling the pressure control valves, the method comprising:

after an external braking demand, continuously ascertaining, by the brake control unit, in the pressure control mode, at least one differential slip value from measuring signals supplied by speed sensors of the wheels, as the difference between the slip of two axles of the vehicle before releasing the control signals;

evaluating the differential slip value with consideration for a predefined or adjustable setpoint differential slip value; and depending on the evaluation, bringing the differential slip value closer to the setpoint differential slip value by adapting at least one control signal, wherein the brake control unit evaluates the at least one ascertained differential slip value with consideration for at least one control intervention criterion and, depending on fulfillment of the at least one control intervention criterion, releases the control signals or adapts at least one control signal for readjusting the differential slip value, and wherein at least one slip threshold value is specified to the brake control unit as a control intervention criterion for evaluation of the differential slip value and, if the slip threshold value is exceeded, an adaptation of the distribution of brake pressure to the axles takes place.

2. The method as claimed in claim 1, wherein during the readjustment of the differential slip value in order to increase a brake pressure of a wheel brake, a control signal of an inlet valve of a particular pressure control valve, and/or in order to decrease a brake pressure, a control signal of an outlet valve of the particular pressure control valve and/or a control signal of an inlet valve or outlet valve acting on a wheel brake of a particular other axle is changed.

3. The method as claimed in claim 1, wherein the brake control unit reduces a brake pressure at an axle of a compared pair of axles having a greater slip, with consideration for the evaluation of the differential slip value.

4. A method for adjusting brake pressures at pneumatically actuated wheel brakes of a vehicle, wherein the brake pressures at the wheel brakes are adjusted in a normal braking mode depending on a driver's braking demand determined by a driver of the vehicle, and wherein, when an external braking demand independent of the driver's braking demand is received and/or when certain wheels tend to lock, a brake control unit takes over adjustment of the brake pressures in a pressure control mode, wherein the brake control unit, in the pressure control mode, ascertains control signals for pressure control valves of the particular wheel brakes and changes the brake pressures of the relevant wheel brake by controlling the pressure control valves, the method comprising:

after an external braking demand, continuously ascertaining, by the brake control unit, in the pressure control mode, at least one differential slip value from measuring signals supplied by speed sensors of the wheels, as the difference between the slip of two axles of the vehicle before releasing the control signals;

evaluating the differential slip value with consideration for a predefined or adjustable setpoint differential slip value; and depending on the evaluation, bringing the differential slip value closer to the setpoint differential slip value by adapting at least one control signal, wherein the brake control unit evaluates the at least one ascertained differential slip value with consideration for at least one control intervention criterion and, depending on fulfillment of the at least one control intervention criterion, releases the control signals or adapts at least one control signal for readjusting the differential slip value, and wherein a tolerance range comprising an upper slip threshold value and a lower slip threshold value is specified to the brake control unit as a control intervention criterion for the evaluation of the differential slip value and, if the upper slip threshold value is exceeded or the lower slip threshold value is fallen below, an adaptation of the distribution of brake pressure to the axles takes place.

5. The method as claimed in claim 4, wherein a first tolerance range having slip threshold values is specified for a braking operation having active retarders and a second tolerance range having slip threshold values is specified for a braking operation without retarders.

6. The method as claimed in claim 1, wherein differential slip values are determined for multiple axles, in each case based on a reference axle taken into account in all axle pairs.

7. The method as claimed in claim 1, wherein the differential slip value is controlled with the predefined or adjustable setpoint differential slip value as the guide variable.

8. The method as claimed in claim 1, wherein the setpoint differential slip value is specified depending on a braking demand resulting from an external braking demand and a driver's braking demand.

9. The method as claimed in claim 1, wherein the setpoint differential slip value is specified depending on an actual deceleration of the vehicle.

10. A method for adjusting brake pressures at pneumatically actuated wheel brakes of a vehicle combination including a motor vehicle and at least one towed vehicle, wherein the brake pressures at the wheel brakes are adjusted in a normal braking mode depending on a driver's braking demand determined by a driver of the vehicle, and wherein, when an external braking demand independent of the driver's braking demand is received and/or when certain wheels tend to lock, a brake control unit takes over adjustment of the brake pressures in a pressure control mode, wherein the brake control unit, in the pressure control mode, ascertains control signals for pressure control valves of the particular wheel brakes and changes the brake pressures of the relevant wheel brake by controlling the pressure control valves, the method comprising:

after an external braking demand, continuously ascertaining, by the brake control unit, in the pressure control mode, at least one differential slip value from measuring signals supplied by speed sensors of the wheels, as the difference between the slip of two axles of the vehicle before releasing the control signals;

evaluating the differential slip value with consideration for a predefined or adjustable setpoint differential slip value; and depending on the evaluation, bringing the differential slip value closer to the setpoint differential slip value by adapting at least one control signal, wherein differential slip values are determined for multiple axles, in each case based on a reference axle taken into account in all axle pairs, and wherein a trailer axle having a least slip at the moment is continuously determined at a present control axle from measuring signals of speed sensors of wheels of the towed vehicle, wherein a trailer differential slip value is ascertained for the control axle according to the difference of the slip of the reference axle of the motor vehicle and the slip of the control axle of the towed vehicle and is brought closer to the setpoint differential slip value by adjusting a trailer brake pressure, and wherein at wheel brakes of the remaining trailer axles that differ from the control axle, the inlet valves of respective pressure control valves are closed after a start point according to the requirement of the external braking demand.

11. The method as claimed in claim 10, wherein the closed switching state of the inlet valves is concluded and is activated again depending on an evaluation of the temporal progression of the trailer differential slip according to the difference of the slip of the particular trailer axle and the slip of the control axle having at least one predefined switching threshold of the trailer differential slip.

12. The method as claimed in claim 11, wherein a reaching and exceeding of a zero line of the trailer differential slip by a tolerance slip value is specified as the first switching threshold and the switching state of the inlet valves is switched when the tolerance slip value is reached.

13. The method as claimed in claim 12, wherein after the trailer differential slip has reached the first switching threshold, a tendency of the braking demand (external braking demand or resultant braking demand) is taken into account and, in the case of a decreasing braking demand , an expanded tolerance range for the trailer differential slip is specified and the inlet valves of the trailer axles, except for the control axle, are held closed until the expanded tolerance range is exited.

14. The method as claimed in claim 11, wherein for the case of an increasing trailer differential slip after the closure of the inlet valves, an initial value of the trailer differential slip at the start point of the closure of the inlet valves is utilized for determining a switching threshold, wherein a second switching threshold is determined as the sum of an increase in the initial value of the trailer differential slip at the point in time of the closure of the inlet valves by a predefined portion of this initial value or a predefined tolerance slip value.

15. The method as claimed in claim 14, wherein for the case of an absolute value of the trailer differential slip decreasing by at least a predefined tolerance slip value after the closure of the inlet valves, the initial value of the trailer differential slip at the start point of the closure of the inlet valves is specified as the third switching threshold.

16. The method as claimed in claim 11, wherein the trailer brake pressure is adjustable by the brake control unit via a trailer pressure control valve, which is connected to a trailer control valve.

17. A braking system of a motor vehicle or a vehicle combination including a motor vehicle as the towing vehicle and at least one towed vehicle, the braking system comprising:
one brake cylinder and one pressure control valve per wheel, which are connected to a brake control unit in a signal-transmitting manner in order to receive control signals during a pressure control mode,
a service-brake valve which can be actuated by a driver of the vehicle, and
a brake signal emitter,
wherein the brake control unit is configured to adjust brake pressures in the brake cylinders in a normal braking mode, depending on a driver's braking demand, by actuating the service-brake valve
wherein the brake control unit is configured to adjust brake pressures in the brake cylinders in a pressure-control mode, via the pressure control valves,
wherein the brake control unit is configured to receive external braking demands which are independent of the driver's braking demand,
wherein the brake control unit is connected to speed sensors of the wheels for detecting rotational behavior and for monitoring a tendency of the wheels of the vehicle to lock based on measuring signals of the speed sensors and, upon determination of a tendency of at least one wheels to lock and/or upon reception of an external braking demand, to take over adjustment of the brake pressures in the pressure control mode,
wherein the brake control unit is configured for continuously determining differential slip values from the measuring signals of the speed sensors as differences between slips of two axles of the vehicle and for evaluating and readjusting the differential slip value according to one predefined or ascertained setpoint differential slip value by adapting the control signals,
wherein the brake control unit is configured to evaluate the at least one ascertained differential slip value with consideration for at least one control intervention criterion and, depending on fulfillment of the at least one control intervention criterion, releases the control signals or adapts at least one control signal for readjusting the differential slip value, and
wherein at least one slip threshold value is specified to the brake control unit as a control intervention criterion for evaluation of the differential slip value and, if the slip threshold value is exceeded, an adaptation of the distribution of brake pressure to the axles takes place.

18. The braking system of a vehicle combination as claimed in claim 17, wherein the towed vehicle comprises an electronic brake module for controlling the pressure control valves of its trailer axles, which is connected in a signal-transmitting manner to the brake control unit.

19. The braking system as claimed in claim 17, wherein the pressure control valves each comprise an inlet valve for increasing the brake pressure and an outlet valve for decreasing the brake pressure.

20. The braking system as claimed in claim 17, wherein the pressure control valves are situated in one or multiple brake circuits which can each be connected to a pressure medium supply via an activating valve in each case, wherein each activating valve is electrically connected to the brake control unit and is switchable.

21. The braking system as claimed in claim 17, wherein the pressure control valves of the wheels of one axle of the vehicle are connected to a pressure medium supply via a shared brake circuit comprising an activating valve.

22. The braking system as claimed in claim 17, wherein an additional trailer pressure control valve, which is connected to a trailer control valve, can be controlled by the brake control unit.

23. A vehicle comprising a braking system as claimed in claim 17.

24. The vehicle as claimed in claim 23, wherein the vehicle is one of a motor vehicle, a towed vehicle configured to be towed by a motor vehicle, or a combination vehicle including a towing vehicle and at least one towed vehicle.

* * * * *